(12) United States Patent
Dixon et al.

(10) Patent No.: US 12,033,411 B2
(45) Date of Patent: Jul. 9, 2024

(54) STROKE BASED CONTROL OF HANDWRITING INPUT

(71) Applicant: Apple Inc., Cupertino, CA (US)

(72) Inventors: Ryan S. Dixon, Mountain View, CA (US); Adrien Delaye, Sunnyvale, CA (US); Dominic L. Howell, San Jose, CA (US); Andrew E. Platzer, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 358 days.

(21) Appl. No.: 17/202,323

(22) Filed: Mar. 15, 2021

(65) Prior Publication Data

US 2021/0350122 A1    Nov. 11, 2021

Related U.S. Application Data

(60) Provisional application No. 63/023,128, filed on May 11, 2020.

(51) Int. Cl.
*G06V 30/32* (2022.01)
*G06F 3/04883* (2022.01)
*G06F 40/279* (2020.01)
*G06N 20/00* (2019.01)

(52) U.S. Cl.
CPC .......... *G06V 30/36* (2022.01); *G06F 3/04883* (2013.01); *G06F 40/279* (2020.01); *G06N 20/00* (2019.01)

(58) Field of Classification Search
CPC ... G06V 30/36; G06F 3/04883; G06F 40/279; G06F 40/171; G06N 20/00
See application file for complete search history.

(56) References Cited

U.S. PATENT DOCUMENTS

| | | | |
|---|---|---|---|
| 4,715,102 A | 12/1987 | Wolf et al. | |
| 7,680,332 B2 | 3/2010 | Ye et al. | |
| 9,378,427 B2 | 6/2016 | Hirabayashi | |
| 9,621,761 B1 | 4/2017 | Abbas | |
| 10,671,844 B2 * | 6/2020 | Dixon | G06F 3/0412 |
| 2011/0285634 A1 | 11/2011 | Lim et al. | |
| 2012/0114245 A1 * | 5/2012 | Lakshmanan | G06F 3/04883 |
| | | | 382/186 |

(Continued)

OTHER PUBLICATIONS

Zitnick, "Handwriting Beautification Using Token Means," Microsoft Research, 2013, retrieved from http://larryzitnick.org/publication/ZitnickSiggraph2013.pdf, 8 pages.

*Primary Examiner* — Helen Zong
(74) *Attorney, Agent, or Firm* — BAKERHOSTETLER

(57) ABSTRACT

The subject technology provides for stroke based control of handwriting input. The disclosed stroke based control facilitates selection, copy, paste, search, data detection and other operations for handwritten electronic text. The selection of text represented by handwritten strokes can be performed without drawing a lasso or other loop around the desired text, by using known boundaries of words and phrases in stroke space. Selection of text in this manner allows copy and/or paste of recognized words or phrases, of images of the words or phrases, and/or of the strokes themselves. Boundaries, in stroke space, of actionable data represented by the strokes can also allow action options to be provided when a user interacts with strokes within the boundary.

20 Claims, 12 Drawing Sheets

(56) References Cited

U.S. PATENT DOCUMENTS

| | | |
|---|---|---|
| 2014/0325351 A1 | 10/2014 | Hirabayashi |
| 2015/0116282 A1 | 4/2015 | Black |
| 2016/0162175 A1 | 6/2016 | Terunuma et al. |
| 2016/0283785 A1* | 9/2016 | Zaitsev .................. G06F 16/00 |
| 2017/0068854 A1* | 3/2017 | Markiewicz ........... G06V 40/10 |

* cited by examiner

STROKE BASED CONTROL OF HANDWRITING INPUT

CROSS REFERENCE TO RELATED APPLICATIONS

This application claims the benefit of priority to U.S. Provisional Patent Application No. 63/023,128, entitled "Stroke Based Control Of Handwriting Input," filed on May 11, 2020, the disclosure of which is hereby incorporated herein in its entirety.

TECHNICAL FIELD

The present description relates generally to processing input from an input device such as an electronic stylus or pen/pencil, and/or touch inputs, including input stroke based control of handwriting input.

BACKGROUND

Interaction with electronic devices can be performed using various input devices, such as touch screen displays, touch-sensitive surfaces, remote controls, mice and other input devices. Touch-sensitive surfaces and touch screen displays, in particular, have become increasingly popular input devices, as has providing handwritten input using such input devices. However, while handwritten input allows for free-form input of handwritten text and non-text inputs, handwritten text conventionally provides less functionality than typed text.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
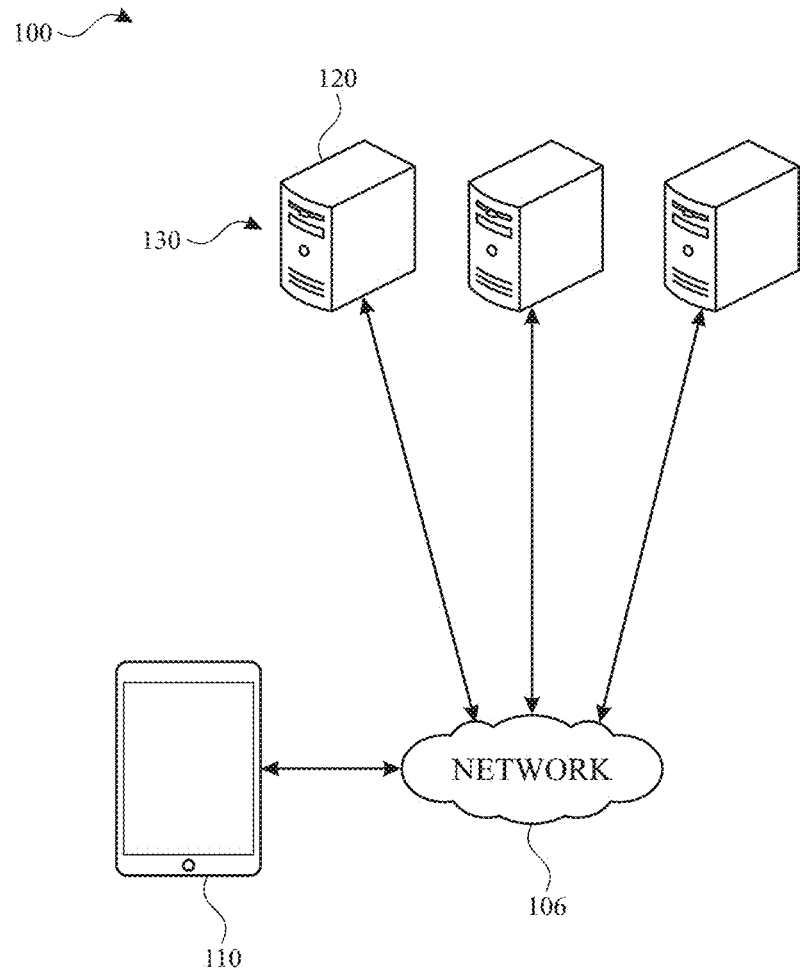
FIG. 1 illustrates an example network environment including an electronic device that may implement the subject system for stroke based control of handwritten input in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A handwriting input method may be an input method for electronic devices that include touch-sensitive surfaces (e.g., touch-sensitive screens, or touch-pads, etc.). Human handwriting may be vastly variable (e.g., in terms of stroke order, size, writing style, language, etc.), and reliable handwriting recognition software tends to be complex and requires a considerable training process. Implementing efficient handwriting recognition on an electronic device with limited computing resources and/or memory is a non-trivial challenge. Implementing efficient use of recognized handwritten text that is represented by handwritten strokes on an electronic device with limited computing resources and/or memory is also a non-trivial challenge.

Handwritten content can be received at an electronic device as, for example, one or more touch inputs and/or as inputs from an electronic stylus or pen/pencil. Such handwritten content can include handwritten text in one or more languages and in any orientation, and/or may include doodles or other non-textual content. In accordance with aspects of the subject system, handwritten text can be recognized from handwritten content in any language and in any orientation, including a curved orientation that is non-static across the handwritten content. Furthermore, the subject system can disambiguate between different overlapping lines of handwritten content and can disambiguate between handwritten text and other handwritten content, such as doodles and the like. In this manner, the subject system can efficiently recognize textual portions of handwritten content and can link the recognized textual portions to the handwritten content, such as for subsequent selecting, copying, pasting, and data detection, in addition to searching, and/or to automatically generate a note/memo or a filename from the handwritten content.

In accordance with aspects of the disclosure, seamless integration of handwritten text inputs with text-interaction options that are typically provided for typed keyboard input is provided. The systems and methods disclosed herein include a machine-learning engine for disambiguation of which strokes in a canvas of handwritten input strokes represent text, and which are not text (e.g., drawings). Text/non-text labels are stored at the stroke level, with which grouping can be performed to construct lines of text. Text recognition can be run on the strokes of each line of text. Following this text recognition, word boundaries can be identified in the stroke space. This knowledge of the word boundaries in stroke space facilitates identification of multiple granularities of groups of text (e.g., words, phrases, lines, paragraphs, etc.), and selection and/or interaction therewith.

Performing the text/non-text disambiguation and text recognition in this way facilitates several text-interaction features, some of which users commonly expect from their interactions with typed text, to be extended to handwritten text. These features include lasso-less selection (e.g., and highlighting) of the handwritten text (e.g., by tapping or touching the handwritten text), including extending an initial selection to continuous or discontinuous groups of text (e.g., words, phrases, lines, paragraphs).

These features also include copying and pasting options including and beyond the options that would be possible for typed text. The copying and pasting options can include, for example, options for copying and pasting an image of the handwritten text, copying the strokes of the handwritten text, or copying and pasting electronic text recognized in the handwritten text (e.g., a transcription of the recognized text). These features also include data detection features such as recognition of parts of the handwritten text that represent actionable data such as phone numbers, addresses, flight numbers, etc. Once actionable data is identified, an area (e.g., a convex polygon) around the handwritten strokes may be identified with which the user can interact to surface actionable options such as calling, messaging, and/or video conferencing with the phone number, opening a map application with directions to the address, checking the status of the flight, etc.

FIG. 1 illustrates an example network environment 100 including an electronic device 110 that may implement the subject system for stroke based control of handwritten inputs in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110 and a server 120 that may be included in a group of servers 130. The network 106 may communicatively (directly or indirectly) couple, for example, the electronic device 110 with the server 120 and/or the group of servers 130. In one or more implementations, the network 106 may be an interconnected network of devices that may include, or may be communicatively coupled to, the Internet. For explanatory purposes, the network environment 100 is illustrated in FIG. 1 as including the electronic device 110, the server 120, and the group of servers 130; however, the network environment 100 may include any number of electronic devices and any number of servers or a data center including multiple servers.

The electronic device 110 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a virtual reality or augmented reality environment. In one or more implementations, the electronic device 110 may include a touchpad. In FIG. 1, by way of example, the electronic device 110 is depicted as a tablet device with a touchscreen. In one or more implementations, the electronic device 110 may be, and/or may include all or part of, the electronic device discussed below with respect to the electronic system discussed below with respect to FIG. 14.

The electronic device 110 may include one or more contact intensity sensors. A contact intensity sensor may include one or more piezoresistive strain gauges, capacitive force sensors, electric force sensors, piezoelectric force sensors, optical force sensors, capacitive touch-sensitive surfaces, or other intensity sensors (e.g., sensors used to measure the force and/or pressure of a contact on a touch-sensitive surface). In an example, a contact intensity sensor can receive contact intensity information (e.g., pressure information or a proxy for pressure information) from the environment. Further, the electronic device 110 can also include at least one contact intensity sensor that is collocated with, or proximate to, a touch-sensitive surface. The electronic device 110, in one example, may also include at least one contact intensity sensor that is located on the back of the electronic device 110, opposite the touchscreen which may be located on the front of electronic device 110.

An intensity of a contact on a touch-sensitive surface (e.g., touchscreen, touchpad, etc.) can refer to a force or a pressure (force per unit area) of a contact (e.g., a finger contact or a stylus contact) on the touch-sensitive surface. Intensity of a contact can be determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Thus, it is appreciated that the contact intensity sensors provided by the electronic device 110 can measure a respective force measurement and/or a respective pressure measurement of a given contact on the touch-sensitive surface.

The electronic device 110 may implement the subject system to receive handwritten input via different input methods including via touchscreen, touch input, or from an electronic stylus or pen/pencil and to provide handwriting recognition and/or stroke-based control of handwritten inputs. The electronic device 110 may implement the example software architecture for handwritten content recognition that is discussed further below with respect to FIG. 4. Examples of operations for stroke-based control of handwritten inputs are discussed further below with respect to FIGS. 4-13.

The server 120 may be part of a network of computers or the group of servers 130, such as in a cloud computing or data center implementation. The server 120 and/or the group of servers 130 may store data, such as handwritten content, photos, music, text, web pages and/or content provided therein, etc., that may be accessible on the electronic device 110. In one or more implementations, the electronic device 110 may support an operation that involves handwritten content that is physically stored on the server 120 and/or one or more servers from the group of servers 130. Examples of handwritten content are illustrated in FIG. 2 discussed below.

Figure 2:
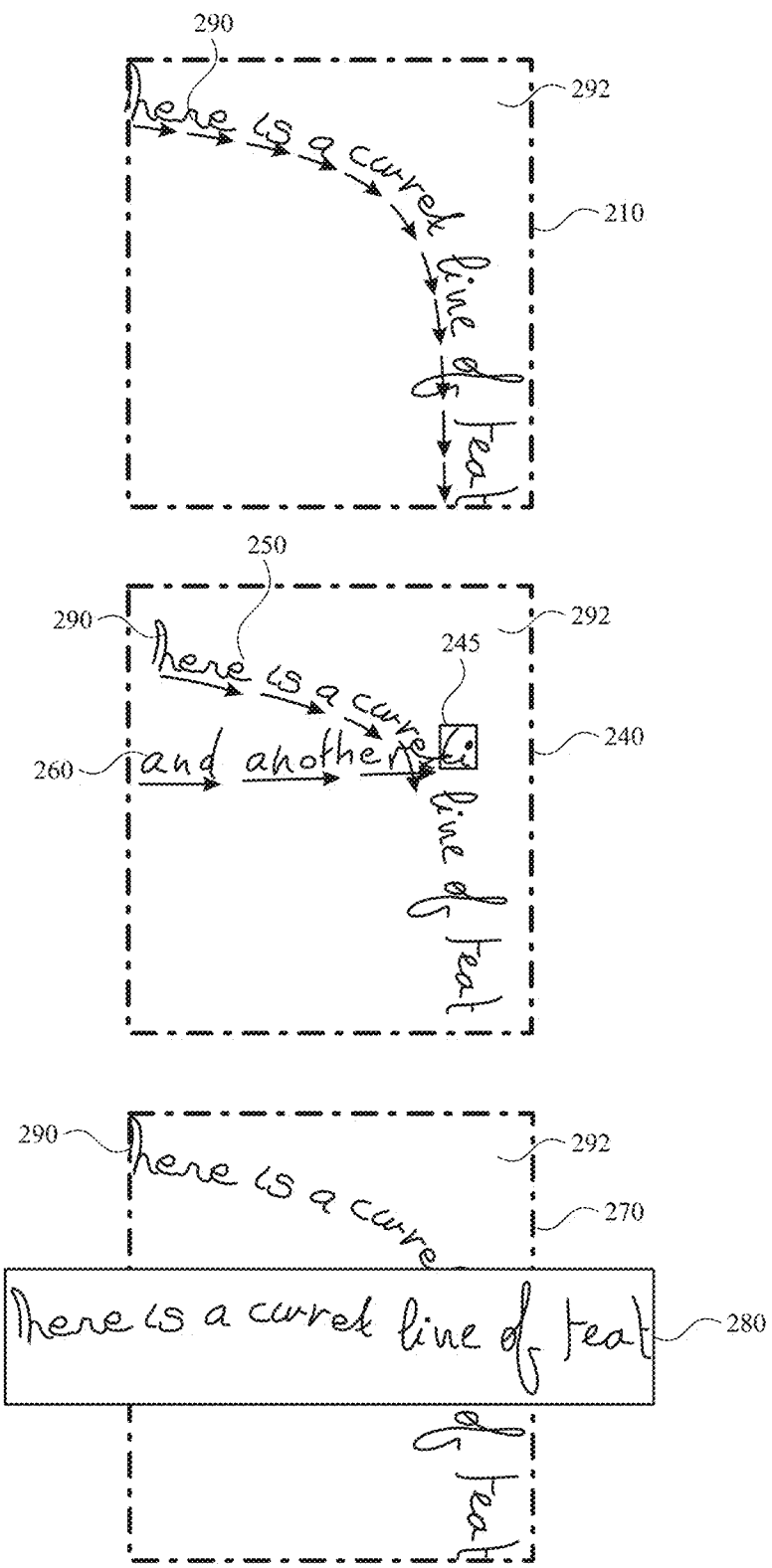
FIG. 2 illustrates examples of handwritten text in accordance with one or more implementations.

FIG. 2 illustrates examples of different handwritten content 210, 240, and 270 in accordance with one or more implementations. In the examples of FIG. 2, handwritten content 210, 240, and 270 are represented by handwritten input strokes 290 that have been received and/or displayed on a handwritten input canvas 292. The handwritten input canvas 292 may be, for example, provided by a user interface (UI) of a handwritten input application such as a notes application, a word processor application, a messaging application, or any other application that can accept handwritten input. Although three examples of handwritten content are shown in FIG. 2 for purposes of explanation, it is appreciated that many other different types of handwriting may be supported by the subject technology. Further not all handwritten content need to be curved and/or overlapping as illustrated in the examples of FIG. 2, and the subject technology may process any type of handwritten content.

As illustrated in FIG. 2, handwritten content 210 includes curved handwritten writing including multiple words and arrows that indicate a writing direction of a line of text corresponding to the curved handwriting. Example processes for determining the writing direction of a given line of text may include, by a stroke group selector, operations done independently on each of the stroke groups taken in any order. For example, the handwritten content 210 may include a line of text corresponding to one stroke group. Writing orientation and ordering of the strokes within a stroke group depend on each other. An iterative process for determining the writing direction may include estimating the writing orientation and order of the strokes by repeating the two following steps until convergence: 1) estimate the direction of writing a and scale s at each stroke, based on their ordering, and 2) estimate the ordering of the strokes, based on their estimated writing direction.

For example, in a first iteration, the ordering used in step 1) above depends on the situation: a) if the group has just been created (e.g., when no estimate of the order pre-exists): the strokes are ordered according to their position in the writing sequence (e.g., based on timestamps); and b) if the group is an existing group being updated: the existing ordering is used; new strokes are inserted at the end if they have been added by end-of-line merge (e.g., merging a new input stroke to a last stroke of an existing stroke group), or at their position in the writing order if they are delayed strokes. A stroke group selector may estimate a direction of writing and scale of each stroke in a particular stroke group. In one or more implementations, writing orientation a is expressed by a directional vector with norm=1 at each stroke. It is computed as an average of vectors pointing from the current stroke center to centers of strokes within a neighborhood around the current stroke given by a certain window. The size of the window may be large enough to obtain robust estimation and small enough to capture changes in orientation of curved text lines.

In one or more implementations, writing orientation is then smoothed using the average value of two neighboring strokes to suppress high frequency changes caused mostly by multi-stroke characters with vertical stroke order. The scale s of each stroke is a measure of the stroke bounding box when rotated along the orientation defined by the corresponding angle alpha (e.g., determined based on arctan (ay/ax)). The width and height of the stroke are, respectively, normalized by the x and y components of the vectors pointing from the center of the stroke to the centers of bounding boxes of its preceding and following neighbors. Like the orientation vectors, the scale vectors are smoothed using average scale values of neighboring strokes. This smoothing offers better robustness to high frequency changes caused by very tiny strokes like dots. Strokes may be ordered by the x-coordinate of their centers in a coordinate system rotated according to the estimated writing orientation. The writing orientation of the whole stroke group may be determined using an average of the respective writing orientation of its strokes, which is then used to get a valid global ordering.

In the example of FIG. 2, the handwritten content 240 includes two separate handwritten lines of text 250 and 260 that are overlapping. Example processes for distinguishing between overlapping lines of text and assigning a stroke 245 to a particular line of text may include segmenting input strokes into fragments which may be also referred to as substrokes herein. In an example, fragments can be full strokes, or sub-sections of complex strokes in which complexity can be based on length or curvature measures. Initially, strokes fragments may be grouped together into text lines based on spatial proximity. When at least multiple fragments are received, these fragments are grouped together in one text line and the orientation of writing and the character size locally are estimated for every fragment in the text line (e.g., measured by an angle and a scalar value). The fragments are sorted along the text line so that the line can be processed by starting from the first fragment and moving along the local writing orientation all the way to the last fragment, e.g., based on a direction of writing.

A stroke input detector may receive an input stroke. The stroke input detector may store this received input stroke into a buffer for (temporary) storage. As referred to herein, a stroke group is a collection of strokes representing a line of text. The strokes are ordered according to an estimate of the writing order within the group. For each stroke inside a group, the writing direction estimate (e.g., a two-dimensional vector) and a scale estimate (e.g., a two-dimensional vector) are stored (e.g., in a buffer). When a new stroke comes in, these computed estimates are utilized to determine if the new input stroke belongs to an existing group.

The stroke group selector may determine whether any stroke group exists. If there are no existing stroke groups, the input stroke is assigned to its own new group. If there is at least one existing group, each existing stroke group is considered for merging with the received input stroke.

For example, in a first pass (e.g., end-of-line merge), each group is considered as a candidate to get the new input stroke assigned as a continuation of its text line (e.g., line of text corresponding to the stroke group). For determining this, a writing orientation and a scale of the last stroke of the stroke group (e.g., according to the writing order) are used to determine an oriented distance from the stroke group to the new input stroke. As described herein, an end-of-line merge can refer to merging a new input stroke to a last stroke of an existing stroke group.

The stroke group selector may select an existing stroke group, determine a last stroke from the existing stroke group, and determine an oriented distance from the last stroke to the new input stroke. In an implementation, an oriented distance calculation can be determined using a vector v pointing from the last stroke S of the selected group to the new input stroke T The vector v may be an average of a vector connecting the two closest points of the two strokes and a vector connecting their centers. The vector v may also be rotated by the writing orientation at stroke S and may be is normalized by the scale of stroke S. The oriented distance may be the weighted norm of vector v.

After the oriented distance is determined, the stroke group selector may determine whether any other stroke groups exist and, if so, select another stroke group and repeat the operations described above from there to determine another oriented distance for the different stroke group. These repeated operations may be performed until the oriented distance is determined for each stroke group.

The stroke group selector may determine whether there is at least one stroke group that meets a threshold for assigning the input stroke based on its oriented distance. If only one stroke group meets the threshold, the new input stroke is assigned (e.g., merged) to this stroke group and the grouping assignment is complete.

Alternatively, if more than one stroke group are good candidates for the new input stroke, each of the respective oriented distances to the new input stroke may be compared. By reference to FIG. 2, the handwritten content 240 includes two separate handwritten lines of text 250 and 260 which may be good candidates for assigning stroke 245. This comparing may include comparing, for each of the respective oriented distances to the new input stroke by the stroke group selector. If an oriented distance of a particular stroke group is sufficiently better (e.g., based on a threshold amount) than the others, the stroke group selector assigns the new input stroke to that particular stroke group. In an example, a threshold on the differences of oriented distances determines if the particular stroke group with the lowest distance is sufficiently better than the other stroke groups to be assigned the new input stroke.

Otherwise, if no stroke group meets the threshold, the stroke group selector considers that the input new stroke can be a delayed stroke to be inserted in the middle of every stroke group. For example, if there is no particular stroke group that is considered sufficiently better, the stroke group selector may determine whether a stroke group which has the most "recent" last stroke (based on the writing timestamp attached to each stroke) wins the new stroke. If so, the stroke group selector assigns the new input stroke to the stroke group with the most recent last stroke based on the timestamp information. Alternatively, in an example, when there is no known stroke ordering, a stroke group with the best score for oriented distance is selected irrespective of the difference from the second best score of a different stroke group.

Further, if no stroke group meets the threshold, the stroke group selector performs the operations for the delayed-stroke merge in a second pass. In this second pass for the delayed stroke merge, for each stroke group, every stroke except the last one is used to determine an oriented distance to the new input stroke. The same decision process for the operations described above applies as in the first pass to determine which stroke group wins the new input stroke.

If the stroke group selector determines that the delayed stroke merge was successful, the new input stroke is assigned to that particular stroke group based on the results of the delayed stroke merge. Otherwise, the stroke group selector assigns the new input stroke to a new stroke group (e.g., as a start of a new text line).

It is further appreciated that the processes described herein can be generalized to work with substrokes instead of strokes. For example, the original strokes are first split into substrokes at certain cut points. Such cut points can be determined according to multiple techniques (e.g., curvature based detection, extrema detection, etc.), then the substrokes are handled like strokes as described above.

As further illustrated, the handwritten content 270 includes a line of text after undergoing a normalization process. The normalization process may include straightening (e.g., by a stroke group normalizer) a curved text line into a regular horizontal line that can be fed to a handwritten content recognizer. Characters are rotated and positioned relative to one another according to the writing orientation. The result is an horizontal straight text line where the writing orientation is normalized, such as horizontally, left-to-right. For example, a given stroke group may be normalized by the stroke group normalizer, before being sent to the handwritten content recognizer, by rotating and positioning individual strokes in the stroke group. In one or more implementations, the stroke group normalizer may rotate each stroke of a stroke group (e.g., first around its center according to the estimated orientation of this stroke), and move each stroke except the first stroke of the stroke group. In one or more implementations, each rotated stroke is then translated (e.g., moved) so its center gets into a normalized position based a normalized center of the stroke. The normalized center of each stroke is given by translation of the normalized center of the previous stroke by an inter-stroke vector rotated by an average of the orientation angles of the two strokes. In one or more implementations, the first stroke in the stroke group is not translated, and only rotated. By reference to FIG. 2, the handwritten content 270 illustrates a normalized stroke group 280 corresponding to a line of text (e.g., overlaid on the original curved line of text).

Although FIG. 2 illustrates examples of handwritten content, it is appreciated that handwritten content may include handwritten text that is written in different directions. For example, such handwritten text may be written right to left, top to down, down to top, or any direction, etc.

In one or more implementations, certain handwritten text that is recognized in handwritten content may be further recognized as actionable data, or an actionable data type. For example, a user may handwrite a phone number, an email address, a physical address, a flight number, etc., that can be detected.

Figure 3:
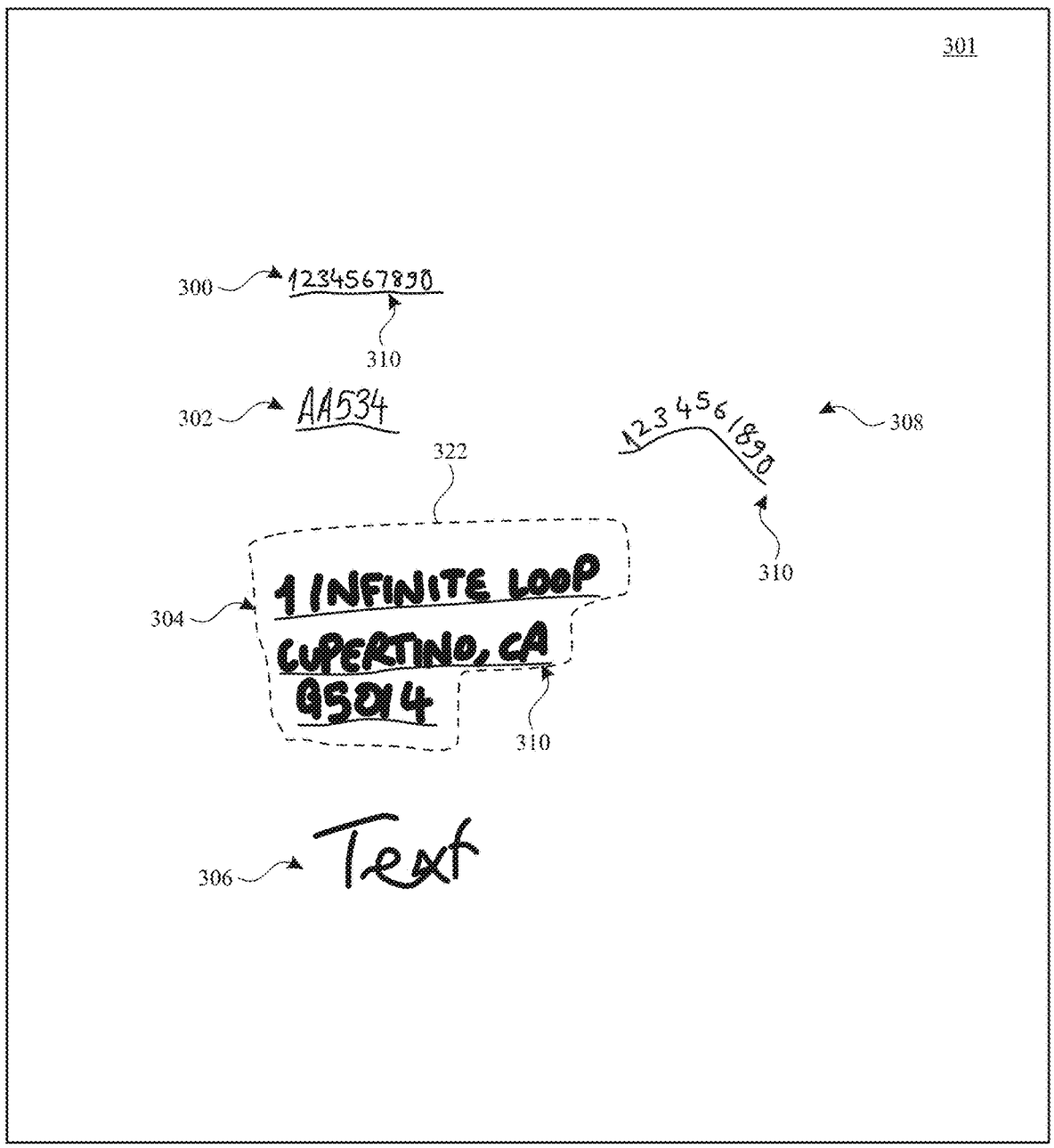
FIG. 3 illustrates examples of handwritten text corresponding to actionable data in accordance with one or more implementations.

FIG. 3 illustrates examples of actionable data that may be included and/or detected in handwritten content. In the example, of FIG. 3, a input canvas 301 includes a handwritten phone number 300, a handwritten flight number 302, a handwritten physical address 304, and other handwritten text 306 that does not correspond to actionable data. In the example of FIG. 3, an electronic device such as electronic device 110 has recognized the handwritten phone number 300, the handwritten flight number 302, the handwritten physical address 304, and the other handwritten text 306, and then identified the handwritten phone number 300, the handwritten flight number 302, and the handwritten physical address 304 as actionable data. In one or more implementations, numeric handwritten input can be identified as words or as groups of numbers. For example, a phone number can be identified as a single word, the components (e.g., the area code, regional code, etc.) of the phone number can be identified as associated words that form a phone number, or groups of individually recognized numerals can be collectively identified at a phone number or a word. As another example, a numeric portion of a handwritten address may be identified as a word in an address or as a group of individually recognized numerals that for a numeric portion of an address. In the example of FIG. 3, the electronic device has also surfaced a visual treatment 310 for each item of actionable data in the input canvas 301. In the example of FIG. 3, the visual treatment 310 is an underline of the text in each time of actionable data. However, other visual treatments are contemplated, such as changes to the thickness of the text, the size of the text, the color of the text, the highlighting of the text etc. can be used. The visual treatment 310 may be, for example, specific to the type of actionable data on the input canvas 301.

In one or more implementations, once actionable data is identified, an area such as area 322 (e.g., polygon such as a convex polygon) around the set of handwritten strokes corresponding to each set of actionable data may be identified on the input canvas 301 (though the area may not be displayed or visible to a user), with which the user can interact to surface actionable options. For example, once the strokes corresponding to the handwritten physical address 304 have been identified, the area 322 can be defined around the identified strokes, so that a later tap or touch within the area 322 causes one or more action options to be provided. In one or more implementations, the action options may be associated with, and/or may correspond to, the particular actionable data and/or data type. For example, the action options can include, for example, calling, messaging, or initiating a video conferencing with the handwritten phone number 300, opening a map application with directions to the handwritten physical address 304, checking the status of the flight corresponding to handwritten flight number 302, etc.

FIG. 3 also illustrates how the handwritten text corresponding to actionable data need not be input in a straight line to be recognized and identified as actionable data. For example, the input canvas 301 also includes the handwritten phone number 300 entered as curved text 308, which has been recognized as actionable data and provided with a visual treatment 310 having a shape that corresponds to the curved shape of the curved text 308. Examples of processes for identifying and/or interacting with actionable data in handwritten content are described below in connection with, for example, FIGS. 5, 7, and 12-14.

Figure 4:
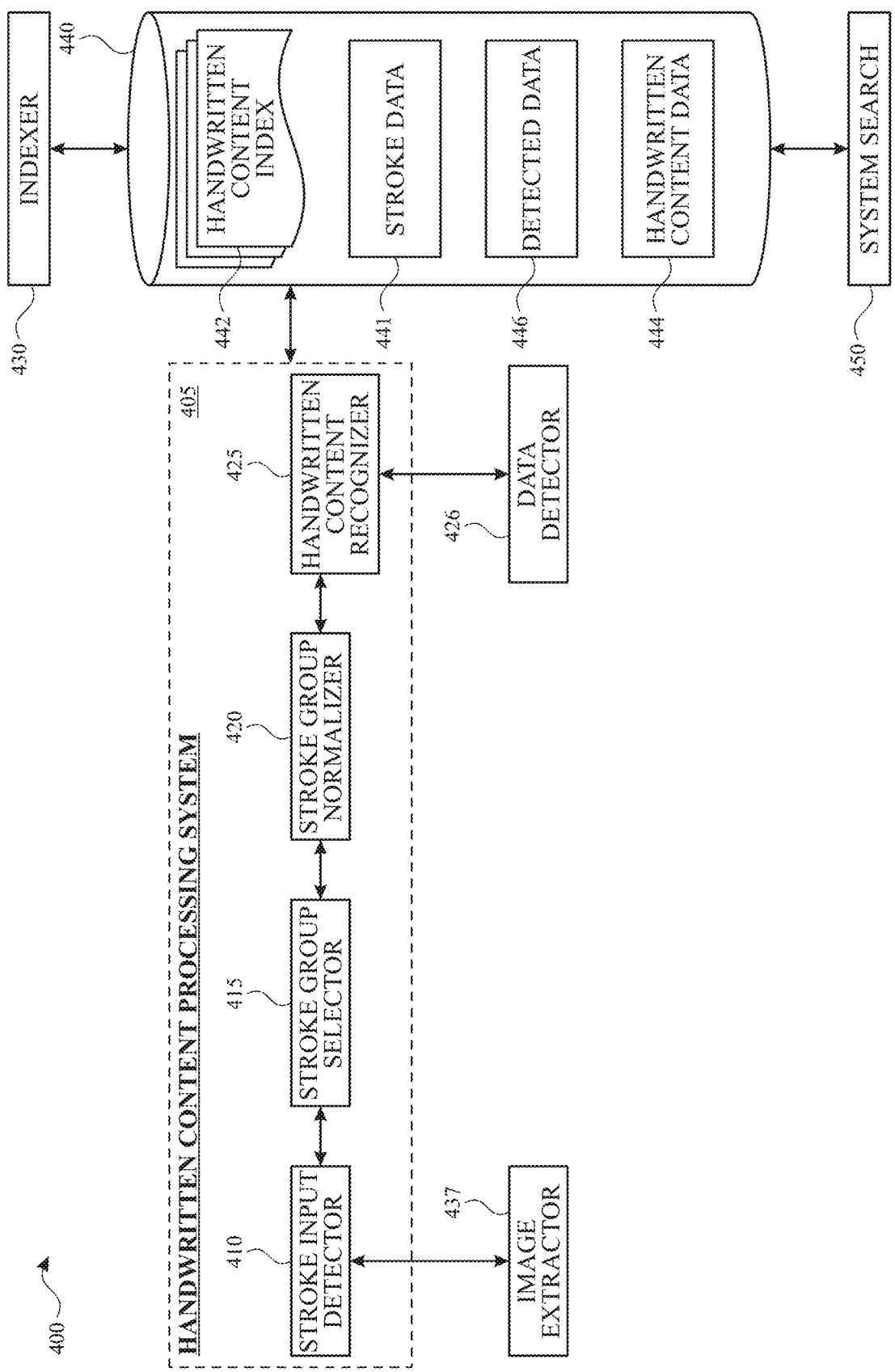
FIG. 4 illustrates an example software architecture that provides handwritten text recognition and data detection for enabling stroke-based control of handwritten text in accordance with one or more implementations.

FIG. 4 illustrates an example software architecture 400 that provides handwritten text recognition and data detection for enabling (e.g., lasso-less) selection of handwritten text, copy and paste of handwritten text, and actionable data operations for handwritten text, in accordance with one or more implementations. For explanatory purposes, the software architecture 400 is described as being provided by the electronic device 110 of FIG. 1, such as by a processor and/or memory of the electronic device 110; however, the software architecture 400 may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated in FIG. 4, the software architecture 400 includes a handwritten content processing system 405. The handwritten content processing system 405 includes a stroke input detector 410, a stroke group selector 415, a stroke group normalizer 420, and a handwritten content recognizer 425. As further illustrated in FIG. 4, the software architecture 400 includes a handwritten content database 440 which provides storage for stroke data 441 describing input strokes (e.g., including vector representations and metadata of the strokes and including locations of the strokes in a canvas or document), handwritten content data 444 describing words, phrases, etc. detected using the input strokes, and detected data 446 describing actionable data detected using the handwritten content data 444.

The stroke input detector 410 receives input strokes corresponding to handwritten input from a user. In one or more implementations, the stroke input detector 410 determines, for a given input stroke, the time, location, direction, stroke pressure, and/or stroke force for the input stroke. Stroke pressure as mentioned herein can refer to a measurement of pressure (e.g., force per unit area) of a contact (e.g., a finger contact or a stylus contact) corresponding to a stroke input on a given touch-sensitive surface (e.g., touchscreen, touchpad, etc.). The stroke input detector 410 samples multiple points within a stroke, takes a timestamp for each point sampled in each stroke. Each point within the stroke may include additional data such as location/proximity, stroke pressure, and/or stroke force. In an example, an input stroke can refer to sensor information received starting at stylus down (or an initial touch input) to stylus up (or a touch release), and, for each input stroke, a set of points that are part of each stroke are sampled. The stroke data 441 can be stored in a handwritten content database 440, as indicated in FIG. 4.

The stroke group selector 415 segments received input strokes into a group that represents a line of text and determines which group new input strokes should be assigned to. For example, the stroke group selector 415 may include a machine-learning engine trained for disambiguation of which strokes in a canvas of handwritten input strokes represent text, and which are not text (e.g., drawings, doodles, artwork, etc.). The machine-learning engine, and/or another machine-learning engine of stroke group selector 415, may also be trained for segmenting received input strokes into a group that represents a line of text and determining which group new input strokes should be assigned to. Stroke group selector 415 may store, for each stroke, a group identifier and/or a line identifier that identifies which group and/or line the stroke belongs to. The group identifier and/or the line identifier for each stroke may be stored in the stroke data 441 in handwritten content database 440. Stroke group selector 415 may also store text/non-text labels at the stroke level (e.g., for each stroke) in the stroke data 441 in handwritten content database 440. Using these text/non-text labels at the stroke level, grouping can be performed to construct lines of text.

The stroke group normalizer 420 normalizes (e.g., straightens, stretches, crops, down-samples or up-samples, etc.) a given group of input strokes such that the group of input strokes can be provided to the handwritten content recognizer 325 as input. Stroke group normalizer 420 may normalize a given group of input strokes as discussed above in connection with FIG. 2.

The handwritten content recognizer 425 comprises a machine learning engine that is trained to recognize words, phrases, sentences, paragraphs, and/or other groups of words (e.g., words, phrase, sentences, paragraphs, and/or other groups of words written in Latin script, Chinese characters, Arabic letters, Farsi, Cyrillic, artificial scripts such as emoji characters, etc.) represented by groups of handwritten input strokes, in at least an implementation. In one or more implementations emojis may be treated as non-text. In one or more implementations, the handwritten content recognizer 425 performs text recognition on the strokes of each line of text identified by stroke group selector 415, to recognize the words, phrases, sentences, paragraphs, and/or other groups of words in the text.

Following this recognition of words, phrases, sentences, paragraphs, and/or other groups of words, the words, phrases, sentences, paragraphs, and/or other groups of words, and/or spatial boundaries of the words, phrases, sentences, paragraphs, and/or other groups of words can be identified in the stroke space by handwritten content recognizer 425, and stored (e.g., in handwritten content data 444 in a handwritten content database 440). In this way, the handwritten content data 444 stored in handwritten content database 440 can facilitate identification of multiple granularities of groups of text (e.g., words, phrases, sentences, lines, paragraphs, etc.), such as for lasso-less selection of the handwritten input text and/or for data detection on the handwritten input text. In some implementations, text and/or groups of strokes can also be selected using a "lasso" operation in which a stylus, touch input, or the like is used to draw a "lasso" around the strokes to select the strokes. However, this can be a time-consuming and/or non-intuitive mode of selection for text. In a lasso-less selection, the text can be selected by tapping or swiping/brushing over the text itself, rather than drawing a lasso around the text.

As indicated in FIG. 4, the software architecture 400 may also include a data detector 426. Data detector 426 may operate on handwritten content data 444 (e.g., words, phrases, sentences, paragraphs, and/or other groups of words) generated by handwritten content recognizer 425 to detect actionable data in the handwritten content data 444. Actionable data may include telephone numbers, flight numbers, physical addresses, email addresses, uniform resource locators (URI)'s, as described in connection with FIG. 3.

Handwritten content data 444 may include, for example, files, documents, images, etc., with handwritten content and/or associated metadata for the handwritten content. Such metadata can include information for rendering the handwritten content for display on the electronic device 110. The software architecture 400 includes an indexer 430 that indexes the handwritten content data 444 with associated input stroke data and stores index data for performing searches on the handwritten content and the associated input stroke data into the handwritten content index 442. The software architecture 400 further includes a system search component 450 that enables searches to be performed, on a system-wide or device-wide level, on the handwritten content data 444 by using the handwritten content index 442.

Further, although recognition of handwritten content is described above, implementations of the subject technology are capable of distinguishing between handwritten content corresponding to text characters and handwritten content that corresponds to, for example, doodles or artwork (e.g., non-textual information). Examples of determining such non-textual information in handwritten content are described in further detail hereinafter in connection with, for example, FIG. 6.

Implementations of the subject technology provide techniques for assigning an input stroke to a stroke group (e.g., a group of input strokes corresponding to a line of handwritten text). No assumption about line writing direction, straightness or scale is made by the techniques described herein. The subject technology is advantageously enabled to follow and normalize a sequence of handwritten printed or cursive characters along any continuous curve: straight line, wavy lines, lines with sharp angles, spirals, squared spirals, etc. The subject technology is agnostic to the script (Latin alphabet, Chinese characters, Arabic, etc.) present in the handwritten content, and can handle any patterns that exhibit the characteristics of handwritten text without assuming or being reliant upon more regularity in the text lines (e.g., horizontality of the writing, enforcing of writing direction, straightness of the text lines, no invariance in character orientation, strict regularity in the size of characters, etc.).

Additionally, the handwritten content recognizer 425 may utilize a ranking algorithm for top n number of likely words. The top candidate words can be stored in a handwritten content index 442, such as for later use in searches, text selections, copy/paste operations and/or data detection.

Stroke data 441 may include, for each of one or more active handwritten input canvases (e.g., in a user interface for a handwritten input application such as a notes application, a word processor application, a messaging application, a graphics application, etc.) and/or for each of one or more stored documents, a set of strokes, and stroke information (e.g., a stroke identifier, a start location, an end location, mathematical curve information, rendering metadata, a group identifier identifying a group or a line that the stroke belongs to, a word identifier identifying the word that the stroke belongs to, etc.) for each stroke. Handwritten content data 444 may include words, phrases, sentences, paragraphs, characters, etc. that have been identified (e.g., in each line) as being represented by the strokes for each active handwritten input canvas or stored document. Detected data 446 may include, for example, actionable data detected in the handwritten content data 444, such as phone numbers, flight numbers, physical addresses, uniform resource locators (URLs), names or other identifiers of stored contacts. Handwritten content index 442 may include indexed information for efficiently identifying stroke data and/or detected data that is associated with words, phrases, etc. in the handwritten content data 444.

Figure 5:
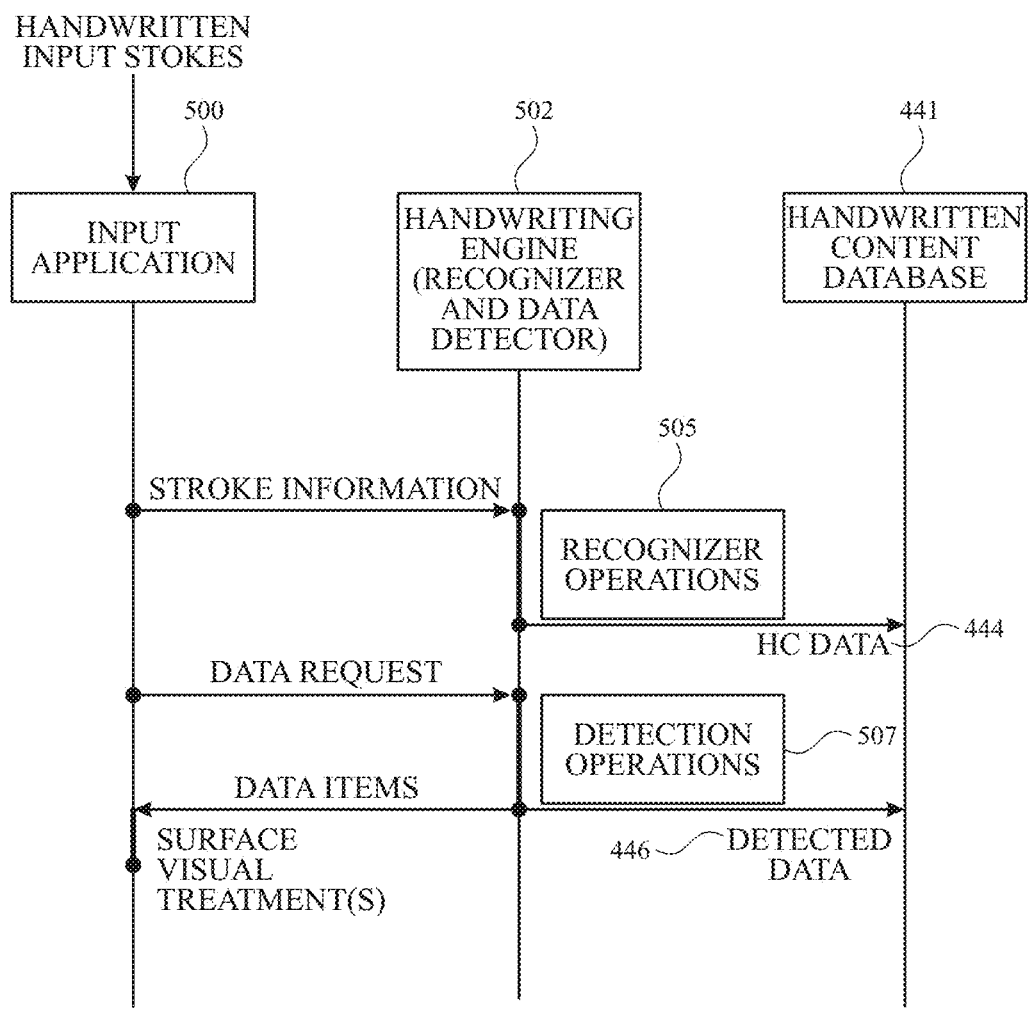
FIG. 5 illustrates a schematic diagram of various operations for recognition and data detection for handwritten content in accordance with one or more implementations.

FIG. 5 illustrates a flow diagram of an example process for processing handwritten input strokes (e.g., including for populating the handwritten content database 440 of FIG. 4) and/or for providing lasso-less selection of text, copy and/or paste operations for selected handwritten text, and/or for detecting and activating actionable data represented by the handwritten input strokes).

As indicated in FIG. 5, an input application 500 (e.g., a handwritten input application such as a notes application, a word processor application, a messaging application, a graphics application, etc.) receives handwritten input strokes (e.g., via a touchscreen or a stylus to a handwritten input canvas, or by opening a stored document containing previous strokes). As indicated, the input application 500 (e.g., directly or via a call to a stroke processing application programming interface (API)) provides stroke information for the handwritten input strokes to a handwriting engine 502. The stroke information may include stroke data 441 for the handwritten input strokes (e.g., as generated by stroke group selector 415 and/or stroke group normalizer 420 of FIG. 4). For example, input application 500 may collate the handwritten input strokes on a handwritten input canvas (or in a handwritten input document) and send the collated strokes to the handwriting engine 502. Handwriting engine 502 may include, for example, handwritten content recognizer 425 and data detector 426 of FIG. 4.

Handwriting engine 502 (e.g., handwritten content recognizer 425) may perform recognizer operations 505 to generate handwritten content data 444 (denoted as HC data in FIG. 5). Further details of recognizer operations 505 are described below in connection with FIG. 6. Handwriting engine 502 may provide the handwritten content data 444 to handwritten content database 440 (e.g., for use in lasso-less selection of text represented by the handwritten input strokes, for use in copy/paste operations that involve input application 500, and/or for use in data detection operations).

For example, responsive to a data request from input application 500 to handwriting engine 502, handwriting engine 502 (e.g., data detector 426) may perform detection operations 507 to generate detected data 446. The data request may be, for example, a request for all data detector items found on the handwritten input canvas, or in a stored document. The detected data 446 can be stored in handwritten content database 440 (e.g., with information indicating which of the handwritten input strokes are associated with specific items of the detected data). Further details of perform detection operations 507 are described below in connection with FIG. 7.

As indicated in FIG. 5, responsive to the data request, handwriting engine 502 may return one or more items in the detected data 446 to the input application 500. For example, handwriting engine 502 may return a collection of all data items detected. The detected data may include, for each data item detected, stroke identifiers of strokes corresponding to the data item, baseline paths, ranges in a string (e.g., a range of the characters in a string that correspond to the data item, where the string includes actionable data and non-actionable text, such as the string "My phone number is 555-123-4567"), and/or a type of the data item (e.g., a phone number, a physical address, an email address, a URL, a flight number, or any other type of actionable data item type).

As indicated in FIG. 5, based on the returned data items, the input application 500 may surface one or more visual treatments, such as the visual treatments 310 shown in FIG. 3, to indicate the detected actionable data on the canvas or in the document. For example, surfacing a visual treatment may include modifying the handwritten content displayed on a canvas to include an underline, a highlight, a color change, or other visual effect. The surface treatment may be specific to a type of data item (e.g., as returned from handwriting engine 502) so that, for example, a phone number appears differently from a physical address.

Figure 6:
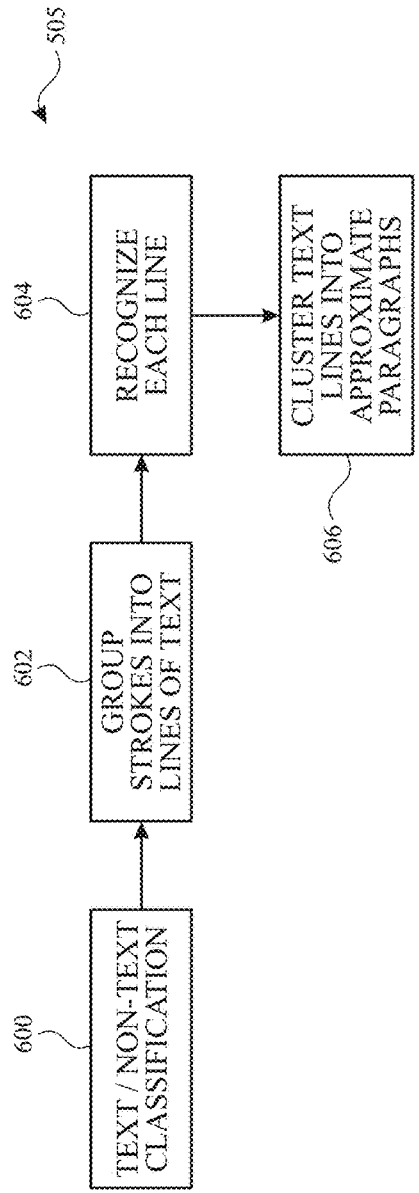
FIG. 6 illustrates a schematic diagram of various operations for text recognition in handwritten content in accordance with one or more implementations.

Illustrative operations that may be included in the recognizer operations 505 of FIG. 5 are shown in FIG. 6. For example, at block 600, the handwriting engine 502 (e.g., handwritten content recognizer 425) may perform text/non-text classification operations to determine which of a plurality of handwritten input strokes correspond to text, and which of the plurality of handwritten input strokes correspond to non-text (e.g., drawings, doodles, etc.). Text/non-text classification operations may include determining an orientation (e.g., as described above) and number of strokes for a stroke group. The stroke group selector 415 can compare the orientation of the stroke group and/or the number of strokes with expected values of each corresponding to textual information. Such expected values may be based on historical information collected by the stroke group selector 415 and/or provided ahead of time based on training information for one or more languages. If the orientation of the stroke group and/or the number of strokes are not within the expected values, the stroke group selector 415 may indicate that the stroke group includes non-textual information. In an example, the stroke group selector 415 can stop processing the stroke group at this point. Alternatively, if the orientation of the stroke group and/or the number of strokes are within the expected values, the stroke group selector 415 indicates that the stroke group includes textual information and continues processing the stroke group (e.g., by performing the operations for stroke merging and/or normalization operations described above).

At block 602, the strokes identified as corresponding to text may be grouped (e.g., into groups of strokes, each group corresponding to a line of text).

At block 604, text recognition operations may be performed for each line of text. For example, one or more words, phrases, and/or sentences can be recognized in each line of text by a machine-learning engine that receives the strokes in that line of text as input.

At block 606, lines of text may be clustered to identify paragraphs of text in the handwritten content.

Figure 7:
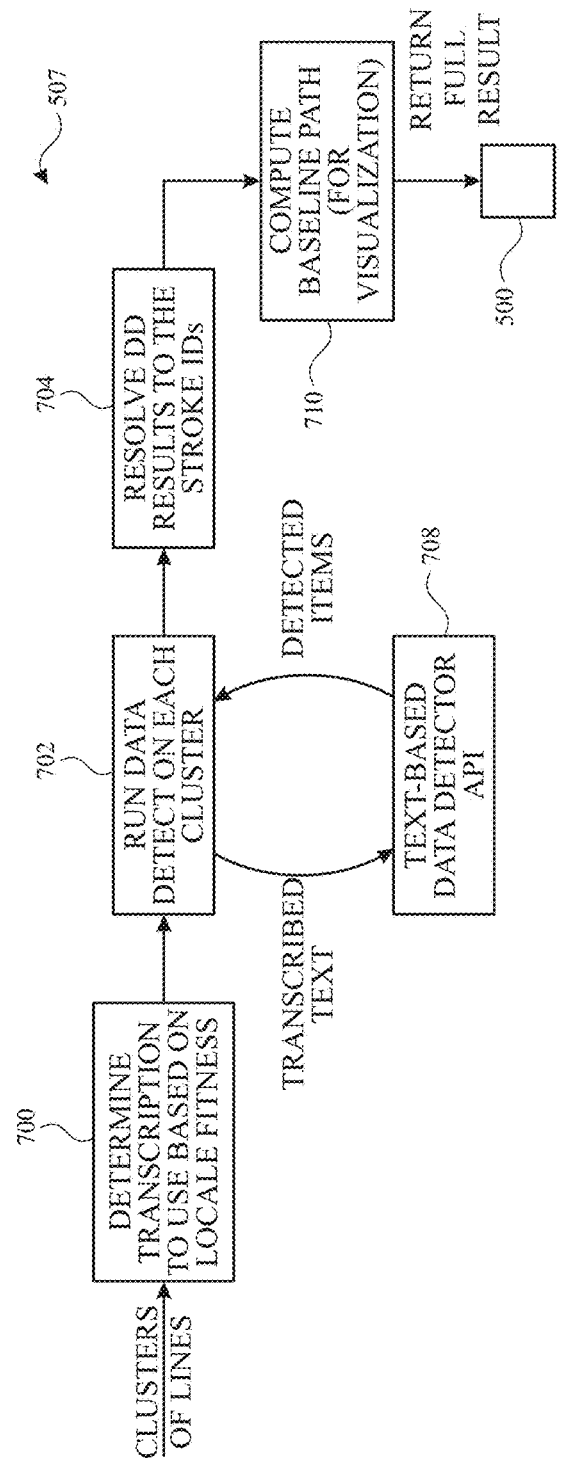
FIG. 7 illustrates a schematic diagram of various operations for data detection for handwritten content in accordance with one or more implementations.

Illustrative operations that may be included in the detection operations 507 of FIG. 5 are shown in FIG. 7. For example, at block 700, the handwriting engine 502 (e.g., data detector 426) may, for each cluster of lines (e.g., as identified at block 606 of FIG. 6), determine a transcription to use for data detection operations (e.g., based on the strokes themselves and/or additional information such as location information obtained using a device on which the input application is running).

At block 702, the data detector 426 may coordinate running a text-based data detection on each cluster of lines (e.g., by providing transcribed text corresponding to each cluster to a text-based data detector API 708, and receiving data items for that cluster from the text-based data detector API). Text-based data detector API 708 may determine, for each cluster, which characters in a transcribed string (e.g., a range of string indices) correspond to actionable data, and/or a type of the actionable data. At block 704, the data detector 426, may resolve the received data items from text-based data detector API 708 to stroke identifiers of the strokes corresponding to the identified cluster. In this way, identified data items can be stored in association with individual strokes in an input canvas or a document.

At block 710, the data detector 426 may compute a baseline path (e.g., a path that runs approximately along the bottoms of the strokes corresponding to each line in the cluster) that can be used to surface visual treatments, such as visual treatment 310 of FIG. 3, for display. The baseline path may be determined based on the an orientation of the strokes in the handwritten text line.

As indicated in FIG. 7, the detected data for each data item may be returned to the input application 500. As described herein, the detected data may include, for each data item detected, stroke identifiers of strokes corresponding to the data item (e.g., as determined at block 704), baseline paths (e.g., as determined at block 710), ranges in a string (e.g., a range of the characters in a string that correspond to the data item, where the string includes actionable data and non-actionable text, such as the string "My phone number is 555-123-4567"), and/or a type of the data item (e.g., a phone number, a physical address, an email address, a URL, a flight number, or any other type of actionable data item type).

As indicated in FIG. 7, the software architecture 400 may be operable to receive handwritten input strokes at an electronic device, identify one or more words represented by the handwritten input strokes, store, in a database, the one or more words, each in association with spatial and/or temporal information for the handwritten input strokes that correspond to that word, identify at least one actionable data item associated with at least some of the one or more words, and store, the at least one actionable data item in the database in connection with the spatial and/or temporal information for the handwritten input strokes that correspond to the at least some of the one or more words.

As illustrated in FIG. 6, identifying the one or more words may include determining whether each of the plurality of handwritten input strokes corresponds to text input or non-text input, grouping handwritten input strokes that are determined to correspond to text input into lines of text, identifying the one or more words by performing recognition operations for each of the lines of text, and identifying clusters of the lines of text.

As illustrated in FIG. 7, identifying the at least one actionable data item may include determining a transcription (e.g., a language or a script) for the plurality of handwritten input strokes, running a text-based data detector (e.g., text-based data detector API 708) on each of the identified clusters of the lines of text, receiving the at least one actionable data item from the text-based data detector, obtaining stroke identifiers for any of the handwritten input strokes that correspond to the at least one actionable data item, and computing a baseline path for a visual treatment of the at least one actionable data item.

The software architecture 400 may also be operable to identify an area (e.g., a polygon) around (e.g., all of) the handwritten input strokes that correspond to the at least one actionable data item, for later selection of the at least one actionable data item by a user.

Figure 8:
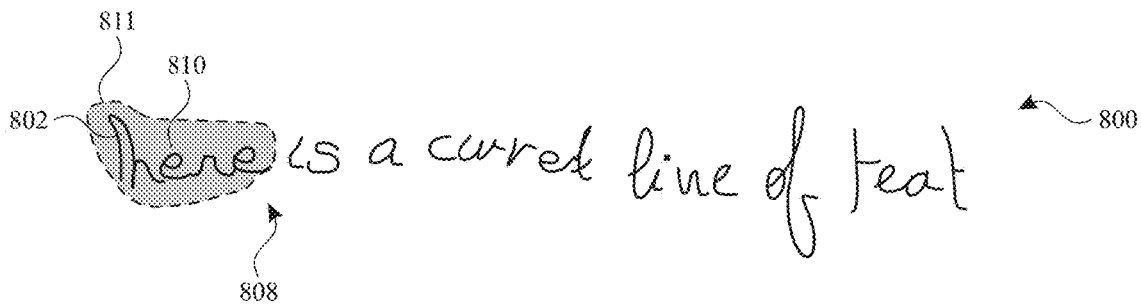
FIG. 8 illustrates various stages of selection of handwritten text in accordance with one or more implementations.
Figure 8:
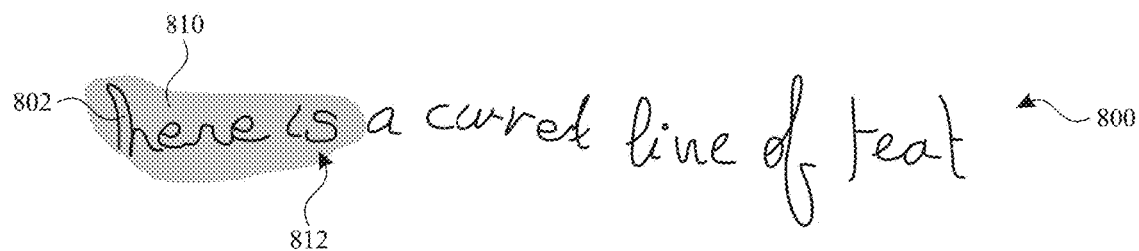
Figure 8:
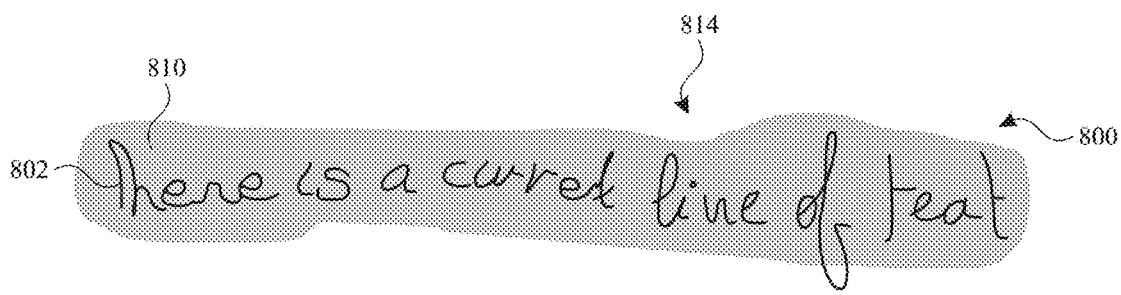
Figure 8:
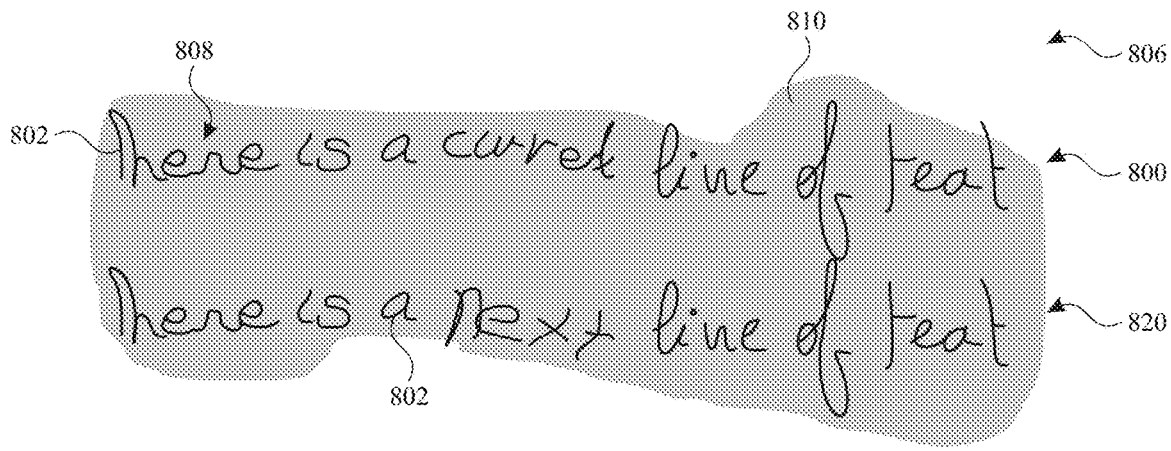

FIG. 8 illustrates various aspects of a lasso-less selection of handwritten input that can be performed using the data in handwritten content database 440 (e.g., generated as described herein in connection with FIGS. 4-7). For example, FIG. 8 illustrates a line 800 of text that has been identified (e.g., by handwriting engine 502) using the strokes 802 (e.g., handwritten input strokes) that make up the line. In this example, handwriting engine 500 has already identified the line 800 and run recognizer operations 505 on the line 800. Accordingly, handwritten content data 444 in handwritten content database 440 includes the words and phrases in line 800 (e.g., including the word "here", the phrase "here is", and the sentence "here is a current line of text").

In the example of FIG. 8, a double tap (e.g., using a finger on a touchscreen or touchpad, using a mouse, or using a stylus) at or near one of the strokes 802 corresponding to the previously recognized word 808 causes the word 808 (e.g., the word "here") to be selected. Selecting the word may cause the word to be highlighted with a selection indicator 810. The selection indicator may be a semitransparent highlight that covers the strokes 802 that are known (e.g., using the stroke data 441 and handwritten content data 444 in handwritten content database 440) to correspond to the word 808. The area covered by selection indicator 810 may be determined, using the known strokes 802 for word 808 at the time of selection, or can fill a word boundary 811 that has been previously determined (e.g., based on the strokes for that word) and stored in the handwritten content data 444 when the word was recognized by handwriting engine 502.

In this way, the word 808 can be selected by double tap (or other touch input) directly on one or more of the corresponding strokes and/or within the previously defined word boundary 811 (e.g., rather than by a lasso or loop drawn around the strokes). Selecting the word 808 may cause a pointer to or other indicator of the word to be temporarily stored (e.g., in a buffer) while the selection indicator 810 is displayed (e.g., until another touch or other input is received at a location away from the word 808 to deselect the word).

As indicated in FIG. 8, another tap of word 808 (e.g., within a predetermined period of time after the double tap, such as within a fraction of a second of the double tap) may cause the device displaying the line 800 of text to identify a next word 812 in the line or one or more additional words of a phrase that includes the word 808 (e.g., the word "is" in FIG. 8), and to extend the selection indicator 810 over the word 808 and the identified next word 812. Because stroke data 441 and handwritten content data 444 identifies the words and the associated strokes for each word, (e.g., and resultantly, the input application has access to knowledge of the boundaries, such as word boundary 811, of words, phrases, sentences, lines, and paragraphs in stroke space), the extension of selection indicator 810 can be extended spatially over groups of strokes, based on the words those strokes represent.

In this way, if a user double taps on a word represented in handwritten strokes, the whole word is selected, without the user having to carefully circle the desired portions of the strokes (e.g., using a lasso tool). For strokes 802 that have been determined to correspond to text, the boundaries can be pre-defined at the time of text recognition (or identified based on the known strokes at the time of selection) and may include word boundaries, phrase boundaries, line boundaries, sentence boundaries, multi-line boundaries, and paragraph boundaries. For strokes that are identified as being non-textual, groups of strokes for selection and/or boundaries around groups of strokes can be defined based on spatial and/or temporal relationships between the strokes. When a user input such as a double tap is detected at or near a particular handwritten input stroke, the device may first determine (e.g., using stroke data 441 and/or handwritten content data 444) whether the stroke is a text stroke or a non-text stroke.

As indicated in FIG. 8, yet another tap of word 808 (e.g., within a predetermined period of time after the additional tap, such as within a fraction of a second of the additional tap) may cause the device displaying the line 800 of text to identify the remaining words 814 in the line or in the sentence including the word 808 (e.g., the words "a current line of text" in FIG. 8), and to extend the selection indicator 810 over the remaining words 814, the word 808 and the identified next word 812.

FIG. 8 also indicates that, in circumstances in which the line 800 of text is part of a cluster of lines that form a paragraph 806 (e.g., including line 800 and line 820), yet another tap of word 808 (e.g., within a predetermined period of time after the yet another tap, such as within a fraction of a second of tap that selected line 800) may cause the device displaying the paragraph 806 of text to identify the remaining words in the paragraph 806 including the word 808, and to extend the selection indicator 810 over the entire paragraph 806. Although multiple taps are described herein as being the input mechanism for selection of the text (e.g., words, phrases, sentences, lines, paragraphs, etc.) represented by strokes 802, it should be appreciated that other input mechanisms can be enabled by the stroke data 441 and the handwritten content data 444 in handwritten content database 440. In this way, as a user continues to tap on a word represented by handwritten strokes, the text selection area spatially increases (e.g., from word to sentence and sentence to paragraph).

Figure 9:
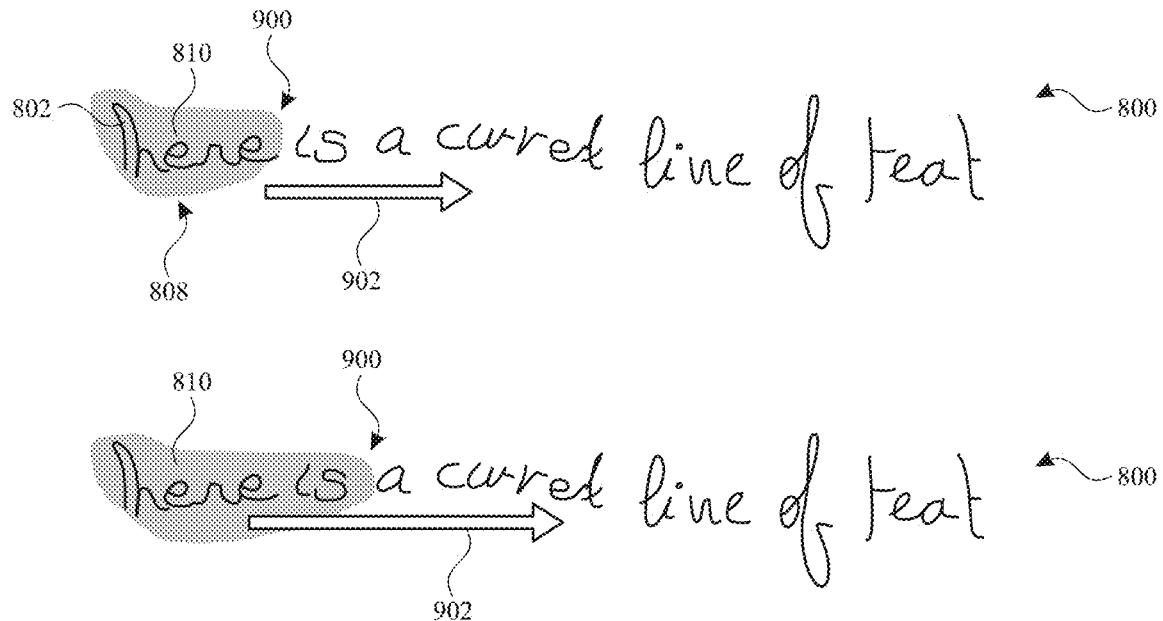
FIG. 9 illustrates various stages of brush-based selection of handwritten electronic text in accordance with one or more implementations.

FIG. 9 illustrates one additional example for selection of text that is represented by strokes 802. In the example, of FIG. 9, after selection indicator 810 is displayed over word 808 (e.g., responsive to a double tap at or near one or more of the strokes previously identified as corresponding to word 808), a brush input (e.g., starting at a location 900 and extending in the direction of arrow 902, such as along the line 800 of text) causes selection indicator 810 to extend over the next word or words in the line 800. Because the stroke data 441 and the handwritten content data 444 indicate the boundaries of the words in stroke space, the extension of selection indicator 810 (responsive to brush input in the direction of arrow 902) can extend word-by-word (e.g., by extending completely over the next word when the brush input moves sufficiently over that word, such as at least halfway over the next word). In operational scenarios in which the input is provided using a stylus, tapping and holding the tip of the stylus on strokes identified as representing text, switches the tip to a "brushing mode" that allows the user to expand the selection by brushing over the text. The user may be provided with the ability to deselect using the brushing mode as well. The brushing mode of selection illustrated in FIG. 9 is still sensitive to semantic (e.g., word) boundaries.

Once any of the handwritten text has been selected, the input application 500 can provide various options for the selected handwritten text. Because the stroke data 441 and the handwritten content data 444 indicate the boundaries of the selected words in stroke space, the options may include options that would not be possible for conventional typed text. For example, FIG. 10 illustrates an example of various options that can be provided for selected handwritten text.

Figure 10:
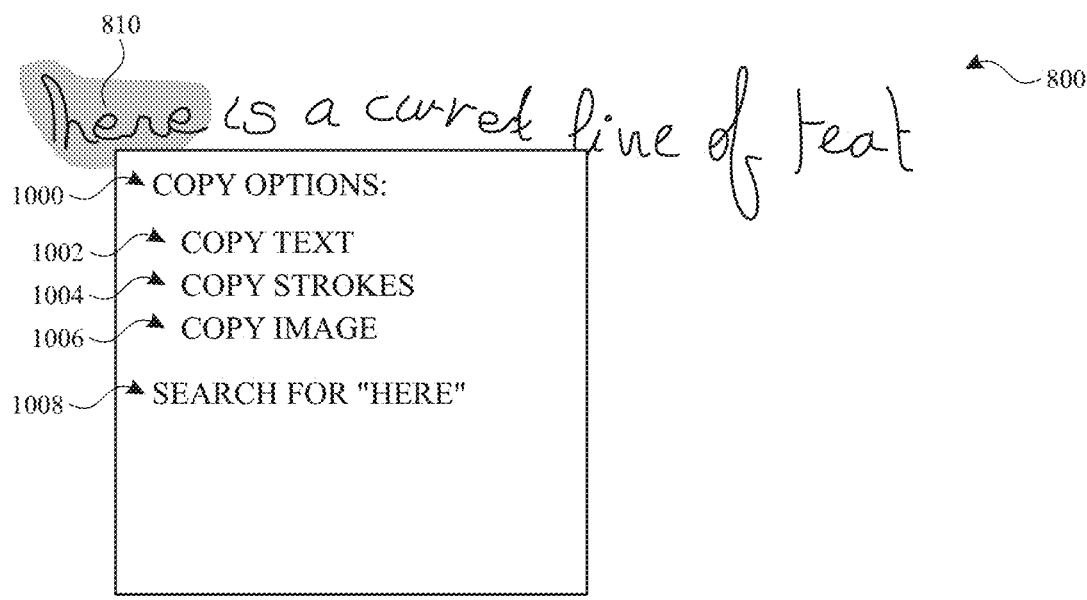
FIG. 10 illustrates various options that can be provided for selected handwritten text in accordance with one or more implementations.

As illustrated in FIG. 10, a subsequent tap at or near the strokes 802 corresponding to the selected word 808 and/or at or near the displayed selection indicator 810 may cause the input application 500 to display one or more copy options 1000 and/or one or more search options 1008. As shown, the copy options 1000 may include an option 1002 to copy the text (e.g., the plain transcription of the word "here" as identified by handwriting engine 502), an option 1004 to copy the strokes 802 corresponding to the selected word 808 (e.g., by copying vector representations of the strokes), and/or an option 1006 to copy an image (e.g., a bitmap image) of the selected word. An option to copy a rich version of the transcription (e.g., including metadata that describes the image of the strokes and/or the stroke data) can be provided.

Selecting the options 1002, 1004, or 1006 may cause the device on which the input application is running to copy the word 808, the strokes associated with the word 808, an image of the word 808 (and/or one or more indicators (e.g., pointers) of the word, the strokes associated with the word, or an image of the word) to a clipboard (buffer) for later use (e.g., in a corresponding paste operation). Although the example of FIG. 10 illustrates the various copy options 1002, 1004, and 1006 being provided at the time of copy, in other implementations a single copy option 1000 can be provided, with various paste options provided at paste time to paste the word, the strokes corresponding to the word, or an image of the word.

As indicated in FIG. 10, the options for selected word 808 may also include search option 1008, such as an option to search (e.g., the current canvas or document, the device, or the Internet) for the selected word (e.g., the word "here" in FIG. 10).

Figure 11:
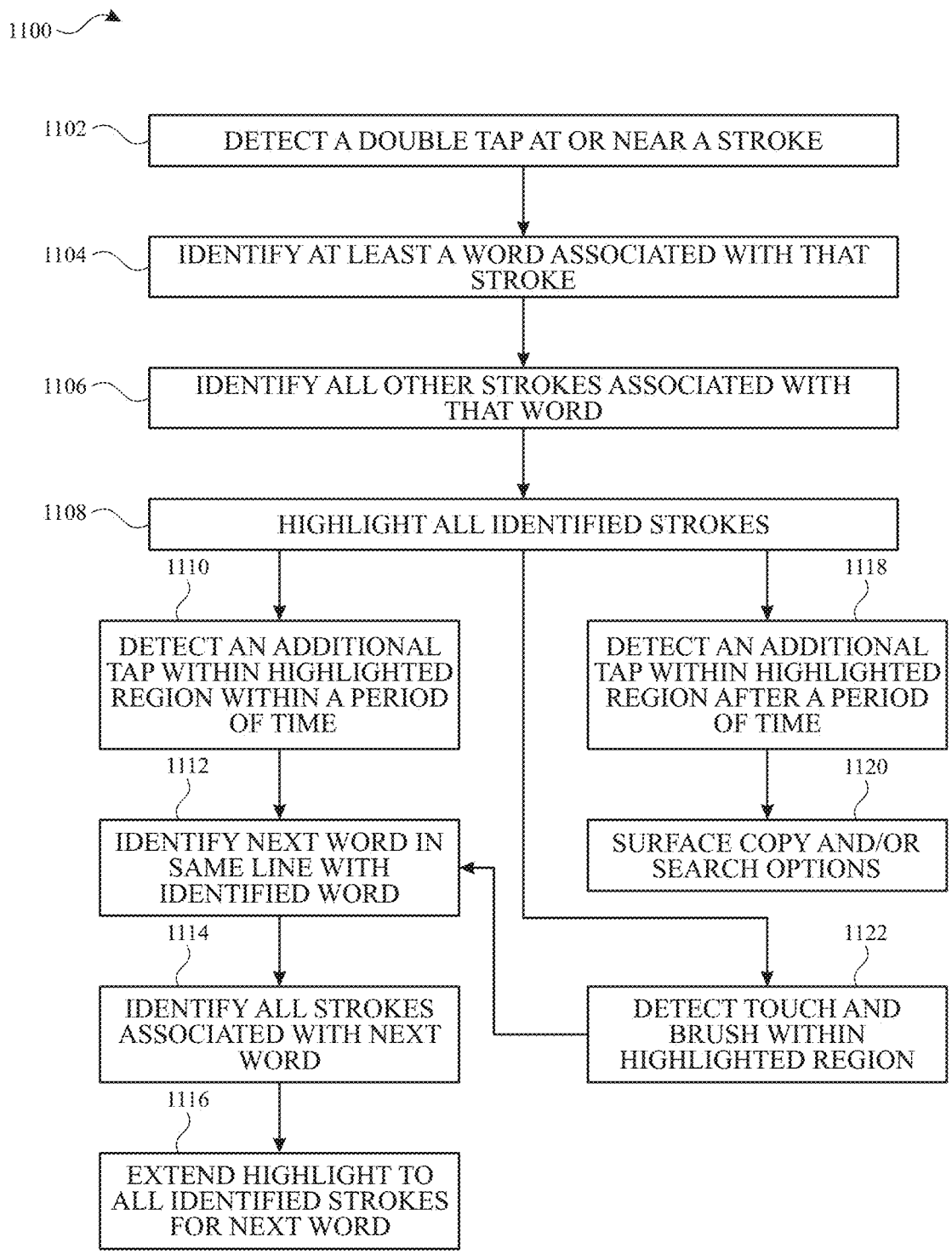
FIG. 11 illustrates a flow diagram of an example process for selecting handwritten text and operating on the selected handwritten text in accordance with one or more implementations.

FIG. 11 illustrates a flow diagram of an example process 1100 for selecting and using handwritten input text in accordance with one or more implementations. For explanatory purposes, the process 1100 is primarily described herein with reference to components of the software architecture 400 of FIG. 4, which may be executed by the electronic device 110 of FIG. 1. However, the process 1100 is not limited to the electronic device 110, and one or more blocks (or operations) of the process 1100 may be performed by one or more other components of other suitable devices and/or software applications. Further for explanatory purposes, the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

In the example process 1100, at block 1102, a user input such as a double tap, or a touch and brush, may be detected at or near a stroke (e.g., a stroke 802) in an input canvas or a document containing previous handwritten input strokes. The stroke may be one of multiple handwritten input strokes that are displayed by an electronic device such as electronic device 110, the handwritten input strokes representing handwritten text. The handwritten input strokes may have been received, at the electronic device (e.g., using a touchscreen of the electronic device, a touchpad of the electronic device, or a stylus associated with the electronic device), obtained from a document containing the strokes, or extracted from a flat document (e.g., as described herein).

Spatial information and/or temporal information associated with one or more of the handwritten input strokes that correspond with a word in the handwritten text may have previously been stored at the electronic device (e.g., in stroke data 441 and/or handwritten content data 444 in handwritten content database 440). The user input may be detected at a location of one of the one or more of the handwritten input strokes. The user input may be a double tap at the location or a touch at the location of the one of the one or more of the handwritten input strokes and a brush over at least another of the one or more of the handwritten input strokes. Prior to storing the spatial information and/or temporal information, handwriting engine 502 may recognize the word in at least one line of the handwritten text, and store, in connection with the recognized word, the spatial information and/or temporal information associated with the one or more of the handwritten input strokes that correspond to the word. Recognizing the word may include providing the handwritten input strokes corresponding to the at least one line of the handwritten text to a machine learning engine that has been trained to recognized words and phrases represented by handwritten strokes.

At block 1104, at least a word (e.g., word 808) that is associated with the stroke may be identified (e.g., using the stroke data 441 and the handwritten content data 444 in handwritten content database 440). For example, a stroke identifier for the stroke may be obtained from the stroke data 441, and a word associated with that stroke identifier may be identified in the handwritten content data 444 (e.g., from a set of stroke identifiers that are linked to the word or a word identifier in the handwritten content data and/or the stroke data). In another example, a word boundary that includes the location of the user input may be identified, the word boundary corresponding to the word and spatially extending around the handwritten strokes representing the word. Identifying the word associated with the stroke may include identifying, based on the location of the user input and the stored spatial information and/or temporal information, a selection of the word. Prior to identifying the selection of the word, it may be determined whether the one of the one or more of the handwritten input strokes is associated with the handwritten text or with non-text handwritten input.

At block 1106, all other strokes associated with that word may be identified. For example, stroke identifiers for all strokes associated with the identified word may be identified using the stroke data 441 and the handwritten content data 444.

At block 1108, (e.g., all of) the identified strokes associated with the identified word may be highlighted (e.g., using a selection indicator 810). Highlighting the identified strokes may include providing (e.g., for display), responsive to the selection of the word, a selection indicator, such as selection indicator 810 of FIG. 8, for the word (e.g., based on the stored spatial information and/or temporal information for (e.g., all of) the one or more of the handwritten input strokes that correspond to the word). The operations of blocks 1102-1108 can be used to select a handwritten word in an electronic input canvas or an electronic document.

As described above in connection with FIG. 8, additional words may be selected such as by an additional tap. For example, at block 1110, an additional tap at or near the strokes of the identified word and/or within the highlighted region indicated by selection indicator 810 may be detected within a predetermined period of time since the detected double tap at block 1102 (e.g., within a predetermined time after the double tap).

At block 1112, responsive to the detected additional tap, a next word in the handwritten text (e.g., a next word in the same line with the identified word or a next word in a next line) may also be identified.

At block 1114, all strokes associated with the identified next word may be identified (e.g., using similar operations to the operations of block 1106).

At block 1116, the highlight (that identifies the selected word) may be extended to the identified strokes of the identified next word (e.g., over all of one or more additional ones of the handwritten input strokes that correspond to the next word).

As described above in connection with FIG. 10, once the strokes corresponding to a selected word have been highlighted, various options for use of the selected word can be provided. For example, at block 1118, an additional tap at or near the strokes of the identified word and/or within the word boundary and/or highlighted region indicated by selection indicator 810 may be detected after a predetermined period of time since the detected double tap at block 1102 (e.g., after the predetermined period of time described in block 1110). For example, an additional user input may be detected at the selection indicator.

At block 1120, responsive to the additional tap, one or more copy and/or search options (e.g. copy options 1000 and/or search option 1008 of FIG. 10) can be surfaced (e.g., rendered and displayed for selection by a user). For example, at least one selectable option associated with the word may be provided responsive to additional user input. The selectable option may include an option to copy the word, an option to copy an image of the word, and an option to copy the one or more of the handwritten input strokes that correspond to the word. After a selection of one of the copy options, an option to paste the word, an option to paste the image of the word, and/or an option to paste the one or more of the handwritten input strokes that correspond to the word can be provided.

FIG. 11 also indicates that, following the highlighting of a selected word at block 1108, at block 1122, a touch and brush input within the highlighted region may be detected (e.g., as described above in connection with FIG. 9). As indicated in FIG. 11, highlighting of next or subsequent words can be performed, responsive to the touch and brush input, as described above in connection with blocks 1112, 1114, and 1116. The touch and brush input can also be provided before the initial word 808 has been selected (e.g., to select the initial word with a brush input).

Figure 12:
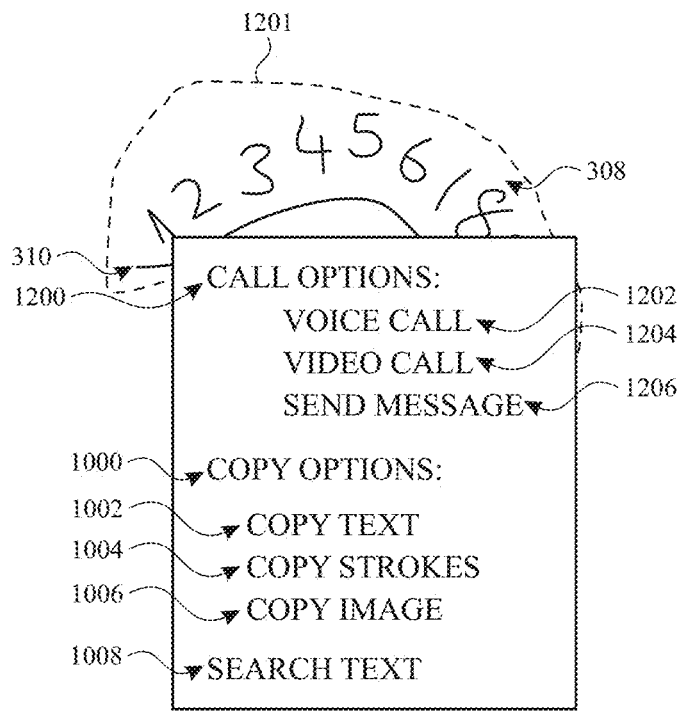
FIG. 12 illustrates various action options that can be provided for actionable data in handwritten text in accordance with one or more implementations.

In various implementations, action options can be provided when a tap is detected in association with actionable handwritten data in an input canvas or a document. FIG. 12 illustrates various action options that can be provided. For example, when a user taps within an area 1201 (e.g., a convex polygon defined by the outermost points of each of the strokes corresponding to a detected data item such as detected the phone number represented by curved text 308), various action options such as call options 1200 may be displayed. As shown, call options 1200 may include an option 1202 to place a voice call to the phone number, an option 1204 to place a video call to the phone number, or an option 1206 to send a message to the phone number.

The example of FIG. 12 illustrates example options that can be provided when a phone number is detected and selected in handwritten text. However, it should be appreciated that other options for phone numbers (e.g., an option to create a new contact or add the phone number to an existing contact) and/or options for other types of detected actionable data (e.g., options to send an email for a detected email address, options to search a map for a detected physical address, or options to obtain a flight status for a detected flight number) can be provided. As indicated in FIG. 12, copy options 1000 and/or search option 1008 can also be provided in connection with a tap of a detected data item (e.g., within area 1201).

Figure 13:
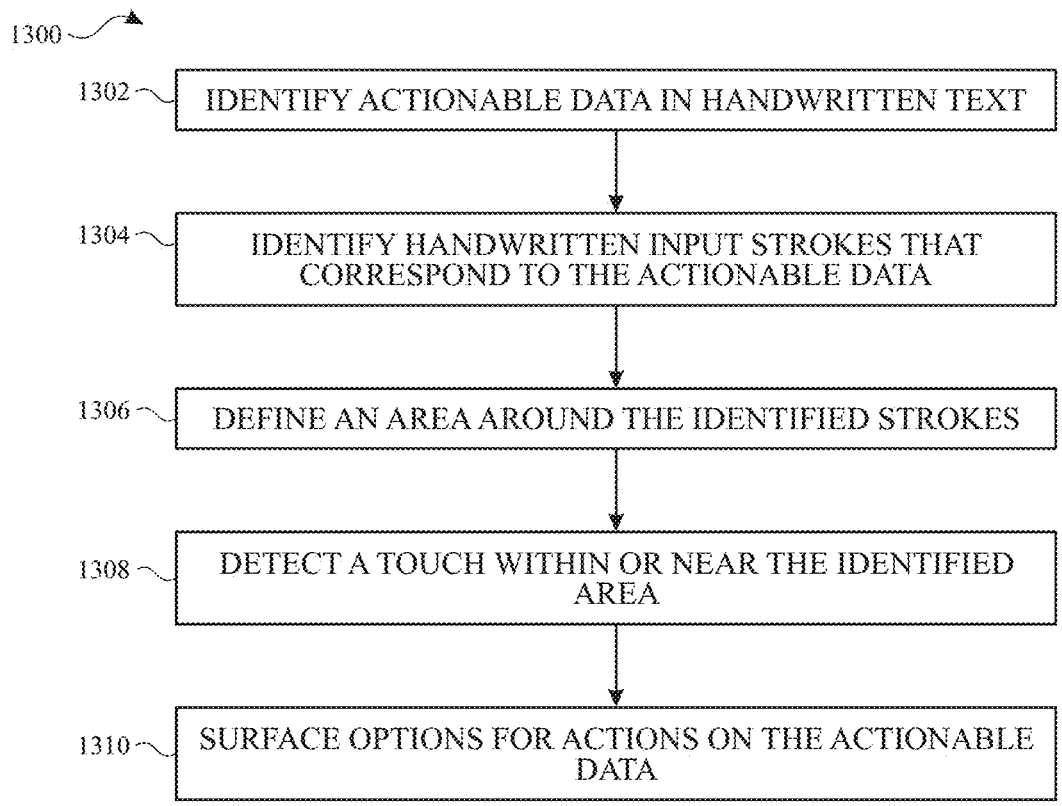
FIG. 13 illustrates a flow diagram of an example process for providing action options for actionable data in handwritten text in accordance with one or more implementations.

FIG. 13 illustrates a flow diagram of an example process 1300 for data detection for handwritten text in accordance with one or more implementations. For explanatory purposes, the process 1300 is primarily described herein with reference to components of the software architecture 400 of FIG. 4, which may be executed by the electronic device 110 of FIG. 1. However, the process 1300 is not limited to the electronic device 110, and one or more blocks (or operations) of the process 1300 may be performed by one or more other components of other suitable devices and/or software applications. Further for explanatory purposes, the blocks of the process 1300 are described herein as occurring in serial, or linearly. However, multiple blocks of the process 1300 may occur in parallel. In addition, the blocks of the process 1300 need not be performed in the order shown and/or one or more blocks of the process 1300 need not be performed and/or can be replaced by other operations.

In the example process 1300, at block 1302, actionable data such as a telephone number, a physical address, an email address, a flight number, etc., is identified in handwritten text (e.g., as described above in connection with FIG. 7). Prior to identifying the actionable data, an electronic device such as electronic device 110 may display a plurality of handwritten input strokes representing the handwritten text. In one example, the actionable data includes a phone number, and the at least one action option includes an option to call the phone number. In another example, the actionable data includes a physical address, and the action option includes an option to display the physical address on a map.

At block 1304, handwritten input strokes that correspond to that actionable data may be identified (e.g., using the stroke data 441 and the detected data 446 in handwritten content database 440). Spatial information and/or temporal information associated with one or more of the handwritten input strokes that correspond to the actionable data represented in the handwritten text may be stored. Storing the spatial information and/or temporal information associated with the one or more of the handwritten input strokes that correspond to actionable data represented in the handwritten text may include recognizing one or more words represented by the handwritten input strokes; identifying the actionable data based on the recognized one or more words, identifying the one or more of the handwritten input strokes that correspond to the identified actionable data, and/or storing the locations of the identified one or more of the handwritten input strokes and/or the temporal input order of the stokes and/or the temporal input sequence for individual strokes. The spatial information may include the spatial locations of the handwritten strokes themselves, the orientations of the strokes and/or characters and/or words identified using the strokes, and/or a convex polygon that encloses (e.g., all of) the one or more of the handwritten input strokes that correspond to the actionable data. The spatial locations of the strokes and/or the temporal information for the strokes may be stored at the time of the input of the strokes. Additional spatial information, such as orientations of the strokes and/or polygon information describing an area around one or more strokes and/or one or more words identified using the strokes may be determined and/or stored when the strokes are input and/or later when one or more words, lines, paragraphs, and/or actionable data are identified using the strokes.

At block 1306, an area such as area 322 of FIG. 3 or area 1201 of FIG. 12 may be defined around the identified handwritten input strokes. For example, identifying the area may include identifying a convex polygon based on the locations and shapes of the identified handwritten input strokes. The operations of block 1306 or another block may include displaying a visual treatment that indicates a type of the actionable data, based on the spatial information and/or temporal information associated with the one or more of the handwritten input strokes that correspond to the actionable data.

At block 1308, a user input at a location of one of the one or more of the handwritten input strokes may be detected. For example, a touch input within or near the identified area may be detected (e.g., with a touchscreen, a touchpad, a mouse, or a stylus). Based on the location of the user input and the stored spatial and/or temporal information, a selection of the actionable data may be detected.

At block 1310, responsive to the selection of the actionable data, at least one action option for the actionable data may be provided. For example, one or more options for actions (e.g., one or more of the action options discussed above in connection with FIG. 12) may be surfaced for selection by a user.

In one or more implementations, the processes described herein may be performed on a newly imported document, for which no stroke information is initially available. For example, the newly imported document may be a flat image, such as a bitmap image, a jpeg image or a GIF image. In order to facilitate performing the stroke-based control operations described herein (e.g., selection of handwritten text in the flat document, copy/paste of handwritten text in the flat documents, and/or detecting and/or providing action options for actionable data), the software architecture 400 of FIG. 4 may also include an image extractor 437, to provide a live documents system that allows transformation of offline strokes (e.g., the strokes previously used to form the flat document) from an image to digital strokes that can be represented in a canvas on a digital device. For example, the software architecture may receive a flat document that includes a flat (e.g., image) representation of previous handwritten input strokes, and may generate handwritten input strokes based on the flat document.

For example, multiple types of images have rich information contained in potential previous handwritten input strokes (e.g., defined as connected components of pixels that may have resulted from human-generated drawings, paintings, handwriting, or machine-generated drawings, and/or included printed text). The image extractor 437 may extract relevant information from these images (e.g., extract previous handwritten input strokes), and construct a digital representation for the extracted information. Once the digital representation is computed, the new "live strokes" can be displayed as handwritten input strokes (e.g., in an active canvas), which can then manipulated, edited, recorded, or searched through, etc. using the other components of software architecture 400 as described herein, thus offering a support similar to that described herein for "online strokes" (e.g., described in connection with FIGS. 1-13 as handwritten input strokes, which can be digital-born strokes, for example, acquired from using a stylus or a digital pen on a compatible digital device, or using a finger on a touch screen). The extracted strokes can be generated by image extractor 437 with metadata that allows the extracted strokes to be rendered digitally with tuned parameters (e.g. thickness and color) so that their visual aspect is as close as possible to their visual aspect in their original context (the input image).

Image extractor 437 may extract, from an image, a set of digital "live strokes". Image extractor 437 may extract the "live strokes" from portions of the image that are visible in the input image as contiguous sets of pixels that form a band of (e.g., nearly) constant width, which may correspond to an extracted stroke width. Such portions of an image often exist, for portions of the image corresponding to text (e.g., printed or handwritten), and generally for other forms of signal produced with drawing or painting tools.

In order to extract the strokes from the image, the image extractor 437 may (i) perform an image processing operation to extract sets of pixels forming potential strokes in the input image, (ii) perform a combinatorial search operation for inferring a most likely path across the pixels of a potential stroke, and (iii) perform a reconstruction operation to reconstruct a vector representation of the potential stroke with appropriate thickness and color.

To detect strokes in an image, the image processing operation (i) above may include receiving an input image and predicting, for each pixel in the input image, a scalar describing the width of the stroke associated with that pixel. This representation can be filtered to extract all regions of the image that constitute good stroke candidates (whether the candidate or potential strokes are text strokes or non-text strokes). The strokes are finally extracted by applying a connected-component extraction. Filtering rules can be tuned to avoid discarding non-text strokes. Each extracted stroke may be characterized, in part, by its predicted stroke width.

In the combinatorial search operation (ii) above, each connected component extracted in operation (i) may be treated separately for path inference. The path inference may reconstruct a likely trajectory across the pixels of the candidate stroke that explain the shape of the potential stroke. For example, operation (ii) may reconstruct the path taken along the pixels by an imaginary pen that could have drawn this potential stroke, with the calculated width of the potential stroke.

To reconstruct the path, the image extractor 437 may extract key points from the skeleton of the stroke (e.g., the points that are equidistant from the stroke boundaries), and determine an ordering over the points that forms one or several paths. A path, as used herein, may be defined as a sequence of points (e.g., x, y coordinates in the original image space), with a start point, an end point, and one or more points in-between. The path describes a pen trajectory from its start to its end, along its intermediate points. Several paths can be combined to best represent a stroke, to account for cases where a "pen-up" movement would be required in the drawing of the input image (e.g., for drawing the letter "T", which is likely described by two paths, one along its horizontal bar from left to right, and one for its vertical bar from top to bottom). Deciding how many paths need to be constructed to represent a stroke, and what points are chosen along these paths, may be performed by the path inference algorithm of the image extractor 437. The path interference algorithm may be a greedy algorithm that attempts to minimize the global cost of the representation, with a cost function that penalizes the total lengths of the path(s) as well as the number of paths.

The result from the combinatorial search operation (ii) may be a set of paths associated to each stroke detected by the image processing operation (i). These paths (e.g., sequences of 2D points) can then be treated similarly to how "online strokes" are processed on a digital device. For example, the paths may each be a vector representation of a drawing, and can be rendered digitally, for example in a 2D canvas on a digital screen. The rendering of these new strokes can utilize a thickness that may be determined based on the estimated stroke width computed in image processing operation (i), so that the digitally rendered extracted strokes have a similar thickness to the corresponding portions of the original input image. Similarly, the color information from the pixel(s) of the image corresponding to extracted strokes can be replicated in the rendering of the extracted stroke to give the extracted strokes a visual aspect as close as possible to their original aspect. The tools and functions described herein, and other tools for digital online strokes (e.g., selection, modification, erasure, copying and pasting, moving, data detection, etc.), can also be applied to the extracted strokes. True "digital-born" online strokes (e.g., acquired from an electronic stylus or from a touch-sensitive screen) can be represented and manipulated jointly.

In addition to using the extracted strokes to facilitate selection of handwritten text, copy/paste of handwritten text and/or data detection in handwritten text, one additional use case for extracted strokes may include extracting thickness and color information from the image (e.g., with or without recording the actual shapes of the strokes). This use case can be described as a style and color importing feature from an image, where digital-born online strokes could be drawn or modified under the thickness and color parameters estimated from an input image.

Figure 14:
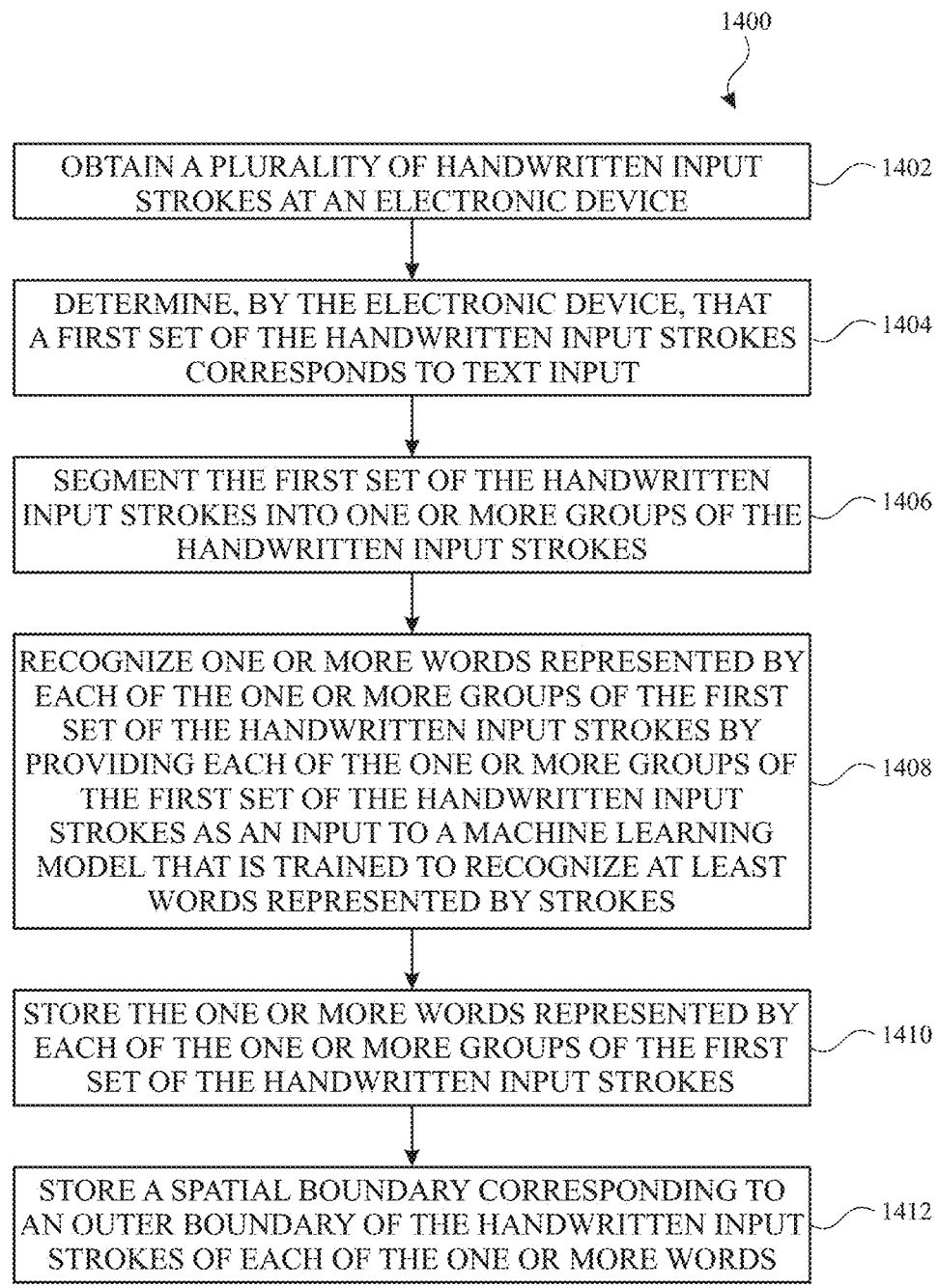
FIG. 14 illustrates a flow diagram of an example process for processing handwritten strokes in accordance with one or more implementations.

FIG. 14 illustrates a flow diagram of an example process 1400 for processing handwritten input strokes in accordance with one or more implementations. For explanatory purposes, the process 1400 is primarily described herein with reference to components of the software architecture 400 of FIG. 4, which may be executed by the electronic device 110 of FIG. 1. However, the process 1400 is not limited to the electronic device 110, and one or more blocks (or operations) of the process 1400 may be performed by one or more other components of other suitable devices and/or software applications. Further for explanatory purposes, the blocks of the process 1400 are described herein as occurring in serial, or linearly. However, multiple blocks of the process 1400 may occur in parallel. In addition, the blocks of the process 1400 need not be performed in the order shown and/or one or more blocks of the process 1400 need not be performed and/or can be replaced by other operations.

In the example process 1400, at block 1402, an electronic device (e.g., stroke input detector 410) may obtain a plurality of handwritten input strokes. In one or more implementations, obtaining the plurality of handwritten input strokes may include receiving the plurality of handwritten input strokes using stylus or a touchscreen of the electronic device. In one or more other implementations, obtaining the plurality of handwritten input strokes may include receiving a flat document that includes a flat representation of previous handwritten input strokes, and generating (e.g., using an image extractor such as image extractor 437) the plurality of handwritten input strokes based on the flat document.

At block 1402, the electronic device (e.g., stroke group selector 415) may determine that a first set of the handwritten input strokes corresponds to text input. The electronic device may determine that a second set of the handwritten input strokes corresponds to non-text input.

At block 1404, the electronic device (e.g., stroke group selector 415) may segment the first set of the handwritten input strokes into one or more groups of the handwritten input strokes. In one or more implementations, at least one of the one or more groups of the first set of the handwritten input strokes corresponds to a line of handwritten text. The groups may also, or alternatively, corresponding to a sentence of text, a paragraph of text, or a phrase of text.

At block 1406, the electronic device (e.g., handwritten context recognizer 425) may recognize one or more words represented by each of the one or more groups of the first set of the handwritten input strokes by providing each of the one or more groups of the first set of the handwritten input strokes as an input to a machine learning model that is trained to recognize at least words represented by strokes.

At block 1408, the electronic device (e.g., handwritten content processing system 405) may store (e.g., in handwritten content database 440) the one or more words represented by each of the one or more groups of the first set of the handwritten input strokes.

At block 1410, the electronic device (e.g., handwritten content processing system 405) may store (e.g., in handwritten content database 440) a spatial boundary corresponding to an outer boundary of the handwritten input strokes of each of the one or more words. In one or more implementations, the electronic device may provide access to the stored one or more words represented by each of the one or more groups of the first set of the handwritten input strokes and the stored spatial boundary corresponding to the outer boundary of the handwritten input strokes of each of the one or more words to facilitate lasso-less selection of handwritten input text corresponding to the plurality of handwritten input strokes.

In one or more implementations, the electronic device may also determine that a second set of the handwritten input strokes corresponds to non-text input. The electronic device may store, for each of the first set of the handwritten input strokes, a text label. The electronic device may store, for each of the second set of the handwritten input strokes, a non-text label. In one or more implementations, the electronic device may also store temporal information for the handwritten input strokes of each of the one or more words.

In one or more implementations, after storing the one or more words and the spatial boundary of each of the one or more words, the electronic device may receive a new handwritten input stroke, determine that the new handwritten input stroke corresponds to text input, determine that the new handwritten input stroke corresponds to one of the one or more groups of the handwritten input strokes, and add the new handwritten input stroke to the one of the one or more groups of the handwritten input strokes. The electronic device may recognize one or more words represented by the one of the one or more groups of the first set of the handwritten input strokes that includes the new handwritten input stroke by providing the one of the one or more groups of the first set of the handwritten input strokes that includes the new handwritten input stroke as a new input to the machine learning model. The electronic device may update the stored one or more words represented by the one of the one or more groups of the first set of the handwritten input strokes that includes the new handwritten input stroke. The electronic device may update the spatial boundary corresponding to the outer boundary of the handwritten input strokes of the one or more words represented by the one of the one or more groups of the first set of the handwritten input strokes that includes the new handwritten input stroke.

In one or more implementations, the electronic device (e.g., handwritten content recognizer 425) may also recognize a phrase represented by at least one of the one or more groups of the first set of the handwritten input strokes by providing the at least one of the one or more groups of the first set of the handwritten input strokes as input to the machine learning model. The electronic device may store (e.g., in handwritten content database 440) the phrase and the one or more words represented by the at least one of the one or more groups of the first set of the handwritten input strokes. The electronic device may store a spatial boundary corresponding to an outer boundary of the handwritten input strokes of the phrase. In one or more implementations, the phrase represented by at least one of the one or more groups of the first set of the handwritten input strokes includes at least one of the one or more words represented by at least one of the one or more groups of the first set of the handwritten input strokes.

The present disclosure recognizes that the use of personal information data, in the present technology, can be used to the benefit of users. For example, the personal information data can be used for providing selectable text and/or action options for actionable data in handwritten electronic text.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing selectable text and/or action options for actionable data in handwritten electronic text, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading or opening an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 15:
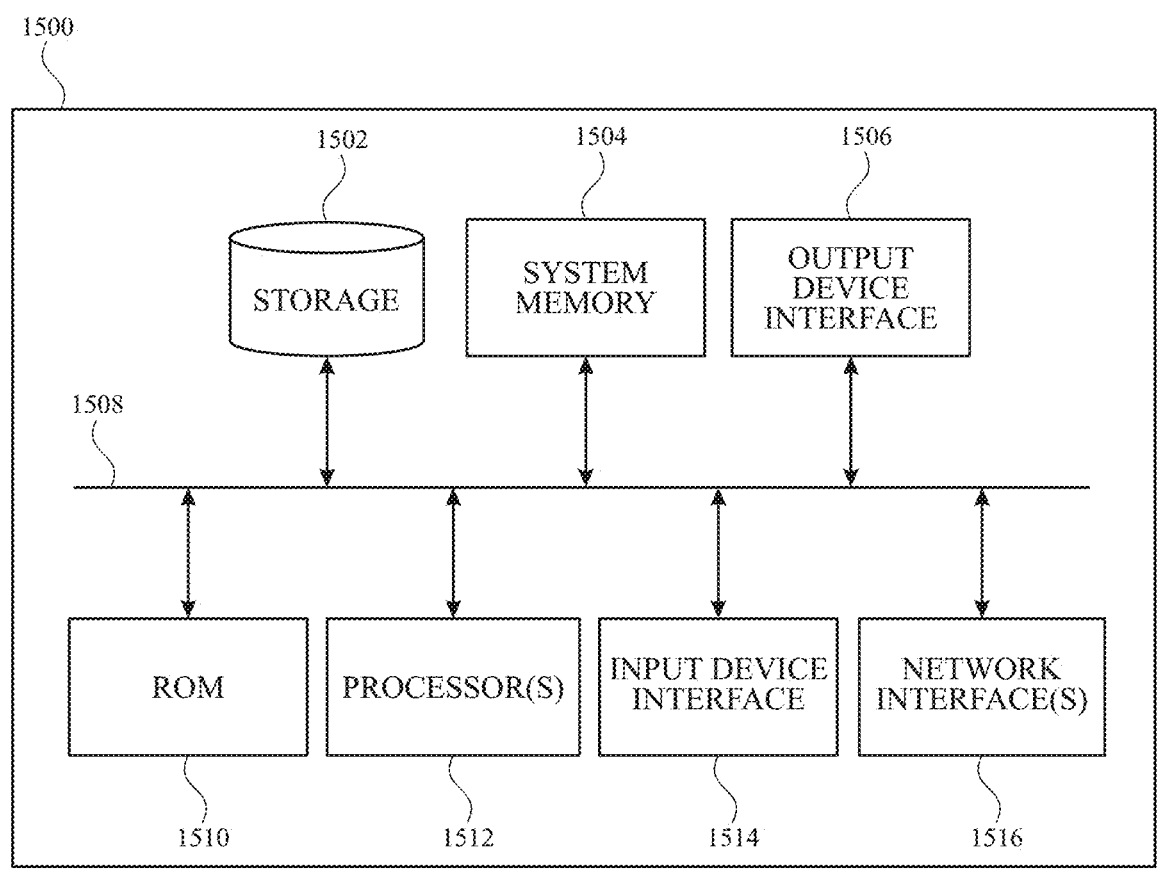
FIG. 15 illustrates an electronic system with which one or more implementations of the subject technology may be implemented.

FIG. 15 illustrates an electronic system 1500 with which one or more implementations of the subject technology may be implemented. The electronic system 1500 can be, and/or can be a part of, the electronic device 110, and/or the server 120 shown in FIG. 1. The electronic system 1500 may include various types of computer readable media and interfaces for various other types of computer readable media. The electronic system 1500 includes a bus 1508, one or more processing unit(s) 1512, a system memory 1504 (and/or buffer), a ROM 1510, a permanent storage device 1502, an input device interface 1514, an output device interface 1506, and one or more network interfaces 1516, or subsets and variations thereof.

The bus 1508 collectively represents all system, peripheral, and chipset buses that communicatively connect the numerous internal devices of the electronic system 1500. In one or more implementations, the bus 1508 communicatively connects the one or more processing unit(s) 1512 with the ROM 1510, the system memory 1504, and the permanent storage device 1502. From these various memory units, the one or more processing unit(s) 1512 retrieves instructions to execute and data to process in order to execute the processes of the subject disclosure. The one or more processing unit(s) 1512 can be a single processor or a multi-core processor in different implementations.

The ROM 1510 stores static data and instructions that are needed by the one or more processing unit(s) 1512 and other modules of the electronic system 1500. The permanent storage device 1502, on the other hand, may be a read-and-write memory device. The permanent storage device 1502 may be a non-volatile memory unit that stores instructions and data even when the electronic system 1500 is off. In one or more implementations, a mass-storage device (such as a magnetic or optical disk and its corresponding disk drive) may be used as the permanent storage device 1502.

In one or more implementations, a removable storage device (such as a floppy disk, flash drive, and its corresponding disk drive) may be used as the permanent storage device 1502. Like the permanent storage device 1502, the system memory 1504 may be a read-and-write memory device. However, unlike the permanent storage device 1502, the system memory 1504 may be a volatile read-and-write memory, such as random access memory. The system memory 1504 may store any of the instructions and data that one or more processing unit(s) 1512 may need at runtime. In one or more implementations, the processes of the subject disclosure are stored in the system memory 1504, the permanent storage device 1502, and/or the ROM 1510. From these various memory units, the one or more processing unit(s) 1512 retrieves instructions to execute and data to process in order to execute the processes of one or more implementations.

The bus 1508 also connects to the input and output device interfaces 1514 and 1506. The input device interface 1514 enables a user to communicate information and select commands to the electronic system 1500. Input devices that may be used with the input device interface 1514 may include, for example, alphanumeric keyboards and pointing devices (also called "cursor control devices"). The output device interface 1506 may enable, for example, the display of images generated by electronic system 1500. Output devices that may be used with the output device interface 1506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 15, the bus 1508 also couples the electronic system 1500 to one or more networks and/or to one or more network nodes, such as the electronic device 110 shown in FIG. 1, through the one or more network interface(s) 1516. In this manner, the electronic system 1500 can be a part of a network of computers (such as a LAN, a wide area network ("WAN"), or an Intranet, or a network of networks, such as the Internet. Any or all components of the electronic system 1500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

In accordance with aspects of the disclosure, a method is provided that includes displaying, with an electronic device, a plurality of handwritten input strokes representing handwritten text; detecting a user input at a location of one of the handwritten input strokes; identifying, based on the location of the user input and stored spatial information associated with one or more of the handwritten input strokes that correspond to a word in the handwritten text, a selection of the word; and providing, responsive to the selection of the word, a selection indicator for the word based on the stored spatial information for the one or more of the handwritten input strokes that correspond to the word.

In accordance with other aspects of the disclosure a method is provided that includes receiving a plurality of handwritten input strokes at an electronic device; identifying one or more words represented by the plurality of handwritten input strokes; storing, in a database, the one or more words, each in association with spatial information for the handwritten input strokes that correspond to that word; identifying at least one actionable data item associated with at least some of the one or more words; and storing, the at least one actionable data item in the database in connection with the spatial information for the handwritten input strokes that correspond to the at least some of the one or more words.

In accordance with other aspects of the disclosure, a method is provided that includes displaying, with an electronic device, a plurality of handwritten input strokes representing handwritten text; detecting a user input at a location of one of the handwritten input strokes; identifying, based on the location of the user input and stored spatial information associated with one or more of the handwritten input strokes that correspond to actionable data represented in the handwritten text, a selection of the actionable data; and providing, responsive to the selection of the actionable data, at least one action option for the actionable data.

In accordance with other aspects of the disclosure, a method is provided that includes obtaining a plurality of handwritten input strokes at an electronic device; determining, by the electronic device, that a first set of the handwritten input strokes corresponds to text input; segmenting the first set of the handwritten input strokes into one or more groups of the handwritten input strokes; recognizing one or more words represented by each of the one or more groups of the first set of the handwritten input strokes by providing each of the one or more groups of the first set of the handwritten input strokes as an input to a machine learning model that is trained to recognize at least words represented by strokes; storing the one or more words represented by each of the one or more groups of the first set of the handwritten input strokes; and storing a spatial boundary corresponding to an outer boundary of the handwritten input strokes of each of the one or more words.

In accordance with other aspects of the disclosure, a non-transitory, machine-readable medium is provided storing instructions which, when executed by one or more processors, cause the one or more processors to: obtain a plurality of handwritten input strokes; determine that a first set of the handwritten input strokes corresponds to text input; segment the first set of the handwritten input strokes into one or more groups of the handwritten input strokes; recognize one or more words represented by each of the one or more groups of the first set of the handwritten input strokes by providing each of the one or more groups of the first set of the handwritten input strokes as inputs to a machine learning model that is trained to recognize at least words represented by strokes; store the one or more words represented by each of the one or more groups of the first set of the handwritten input strokes; and store a spatial boundary corresponding to an outer boundary of the handwritten input strokes of each of the one or more words.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   obtaining a plurality of handwritten input strokes at an electronic device;
   determining, by the electronic device, that a first set of the handwritten input strokes corresponds to text input;
   segmenting the first set of the handwritten input strokes into one or more groups of the handwritten input strokes;
   recognizing one or more words represented by each of the one or more groups of the first set of the handwritten input strokes;
   storing the one or more words represented by each of the one or more groups of the first set of the handwritten input strokes; and
   storing, in association with each of the one or more words, a spatial boundary corresponding to an outer boundary of the handwritten input strokes of each of the one or more words.

2. The method of claim 1, further comprising:
   determining, by the electronic device, that a second set of the handwritten input strokes corresponds to non-text input;
   storing, for each of the first set of the handwritten input strokes, a text label; and
   storing, for each of the second set of the handwritten input strokes, a non-text label.

3. The method of claim 1, wherein at least one of the one or more groups of the first set of the handwritten input strokes corresponds to a line of handwritten text.

4. The method of claim 1, further comprising storing temporal information for the handwritten input strokes of each of the one or more words.

5. The method of claim 1, further comprising, after storing the one or more words and the spatial boundary of each of the one or more words:
   receiving a new handwritten input stroke;
   determining that the new handwritten input stroke corresponds to text input;
   determining that the new handwritten input stroke corresponds to one of the one or more groups of the handwritten input strokes;
   adding the new handwritten input stroke to the one of the one or more groups of the handwritten input strokes
   recognizing one or more words represented by the one of the one or more groups of the first set of the handwritten input strokes that includes the new handwritten input stroke by providing the one of the one or more groups of the first set of the handwritten input strokes that includes the new handwritten input stroke as a new input to a machine learning model;
   updating the stored one or more words represented by the one of the one or more groups of the first set of the handwritten input strokes that includes the new handwritten input stroke; and
   updating the spatial boundary corresponding to the outer boundary of the handwritten input strokes of the one or more words represented by the one of the one or more groups of the first set of the handwritten input strokes that includes the new handwritten input stroke.

6. The method of claim 1, wherein recognizing the one or more words represented by each of the one or more groups of the first set of the handwritten input strokes comprises providing each of the one or more groups of the first set of the handwritten input strokes as an input to a machine learning model that is trained to recognize at least words represented by stroke, and the method further comprises:
   recognizing a phrase represented by at least one of the one or more groups of the first set of the handwritten input strokes by providing the at least one of the one or more groups of the first set of the handwritten input strokes as input to the machine learning model;
   storing the phrase and the one or more words represented by the at least one of the one or more groups of the first set of the handwritten input strokes; and
   storing a spatial boundary corresponding to an outer boundary of the handwritten input strokes of the phrase.

7. The method of claim 6, wherein the phrase represented by at least one of the one or more groups of the first set of the handwritten input strokes includes at least one of the one or more words represented by at least one of the one or more groups of the first set of the handwritten input strokes.

8. The method of claim 1, further comprising providing access to the stored one or more words represented by each of the one or more groups of the first set of the handwritten input strokes and the stored spatial boundary corresponding to the outer boundary of the handwritten input strokes of each of the one or more words to facilitate lasso-less selection of handwritten input text corresponding to the plurality of handwritten input strokes.

9. The method of claim 1, wherein obtaining the plurality of handwritten input strokes comprises receiving the plurality of handwritten input strokes using stylus or a touchscreen of the electronic device.

10. The method of claim 1, wherein obtaining the plurality of handwritten input strokes comprises:
   receiving a flat document comprising a flat representation of previous handwritten input strokes; and
   generating the plurality of handwritten input strokes based on the flat document.

11. A non-transitory, machine-readable medium storing instructions which, when executed by one or more processors, cause the one or more processors to:
   obtain a plurality of handwritten input strokes;
   determine that a first set of the handwritten input strokes corresponds to text input;
   segment the first set of the handwritten input strokes into one or more groups of the handwritten input strokes;
   recognize one or more words represented by each of the one or more groups of the first set of the handwritten input strokes;
   store the one or more words represented by each of the one or more groups of the first set of the handwritten input strokes; and
   store a spatial boundary corresponding to an outer boundary of the handwritten input strokes of each of the one or more words.

12. The non-transitory, machine-readable medium of claim 11, wherein the instructions, when executed by one or more processors, further cause the one or more processors to:
   determine that a second set of the handwritten input strokes corresponds to non-text input;
   store, for each of the first set of the handwritten input strokes, a text label; and
   store, for each of the second set of the handwritten input strokes, a non-text label.

13. A method, comprising:
   receiving a plurality of handwritten input strokes at an electronic device;
   identifying one or more words represented by the plurality of handwritten input strokes;
   storing, in a database, the one or more words, each in association with spatial information and temporal information for the handwritten input strokes that correspond to that word;
   identifying at least one actionable data item associated with at least some of the one or more words; and
   storing the at least one actionable data item in the database in connection with the spatial information for the handwritten input strokes that correspond to the at least some of the one or more words.

14. The method of claim 13, wherein identifying the one or more words comprises:
   determining whether each of the plurality of handwritten input strokes corresponds to text input or non-text input;
   grouping handwritten input strokes that are determined to correspond to text input into lines of text;
   identifying the one or more words by performing recognition operations for each of the lines of text; and
   identifying clusters of the lines of text.

15. The method of claim 14, wherein identifying the at least one actionable data item comprises:
   determining a transcription for the plurality of handwritten input strokes;
   running a text-based data detector on each of the identified clusters of the lines of text;
   receiving the at least one actionable data item from the text-based data detector;
   obtaining stroke identifiers for any of the handwritten input strokes that correspond to the at least one actionable data item; and
   computing a baseline path for a visual treatment of the at least one actionable data item.

16. The method of claim 15, further comprising identifying an area around the handwritten input strokes that correspond to the at least one actionable data item, for selection of the at least one actionable data item.

17. The method of claim 13, wherein the at least one actionable data item comprises a phone number or an address.

18. The method of claim 13, wherein the spatial information for the handwritten input strokes that correspond to the at least some of the one or more words comprises a convex polygon that encloses the handwritten input strokes that correspond to the at least one actionable data item.

19. The method of claim 13, further comprising generating, for display, a visual treatment that indicates a type of the at least one actionable data item, based on the spatial information and the temporal information for the handwritten input strokes that correspond to the at least some of the one or more words.

20. The method of claim 19, wherein generating the visual treatment comprises determining a baseline for the handwritten input strokes that correspond to the at least some of the one or more words based on an orientation of each of the handwritten input strokes that correspond to the at least some of the one or more words.

* * * * *

UNITED STATES PATENT AND TRADEMARK OFFICE
CERTIFICATE OF CORRECTION

| | |
|---|---|
| PATENT NO. | : 12,033,411 B2 |
| APPLICATION NO. | : 17/202323 |
| DATED | : July 9, 2024 |
| INVENTOR(S) | : Ryan S. Dixon et al. |

It is certified that error appears in the above-identified patent and that said Letters Patent is hereby corrected as shown below:

In the Claims

Column 33, Line 1 (Claim 8): "selection of handwritten" should read --selection of the handwritten--.

Signed and Sealed this
Twelfth Day of November, 2024

Katherine Kelly Vidal
*Director of the United States Patent and Trademark Office*